(12) United States Patent
Shiomi et al.

(10) Patent No.: US 7,336,570 B1
(45) Date of Patent: Feb. 26, 2008

(54) APPARATUS AND METHOD FOR ADJUSTING THE TILT ANGLE OF AN OPTICAL PICKUP DEVICE

(75) Inventors: Tetsuhiro Shiomi, Kanagawa (JP); Seiichiro Oishi, Tokyo (JP); Ryuji Takeda, Tokyo (JP); Mitsuhiko Awata, Kanagawa (JP); Takahiro Komazaki, Kanagawa (JP); Yasushi Saito, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/476,776

(22) Filed: Dec. 30, 1999

(30) Foreign Application Priority Data

Jan. 7, 1999   (JP)   ............................... P11-002123

(51) Int. Cl.
B11B 7/00 (2006.01)
(52) U.S. Cl. ............................... 369/44.32; 369/53.19; 369/30.87
(58) Field of Classification Search ................ 369/112, 369/215, 219, 244, 195, 77.1, 199, 77.2, 369/44.13, 44.32, 44.41, 112.02, 53.19, 53.12, 369/53.14, 53.15, 44.27, 44.35, 219.1, 53.34, 369/53.37, 30.87, 30.08, 124.05, 124.13; 360/130.21, 71, 75.1, 75.2, 99.02, 99.03, 360/99.06, 99.07
See application file for complete search history.

(56) References Cited

U.S. PATENT DOCUMENTS

| | | | | |
|---|---|---|---|---|
| 5,001,690 A | * | 3/1991 | Kamiya et al. | ........... 369/44.32 |
| 5,027,336 A | * | 6/1991 | Sugiura | .................... 369/44.13 |
| 5,058,097 A | * | 10/1991 | Suzuki et al. | ................ 369/215 |
| 5,206,848 A | * | 4/1993 | Kusano et al. | ........... 369/44.41 |
| 5,311,497 A | * | 5/1994 | Takizawa et al. | ........... 369/219 |
| 5,493,560 A | * | 2/1996 | Kim | .......................... 369/215 |
| 5,502,698 A | * | 3/1996 | Mochizuki | ............... 369/44.32 |
| 5,784,229 A | * | 7/1998 | Hashi | .................... 360/130.21 |
| 6,021,104 A | * | 2/2000 | Shiomi | ....................... 369/77.1 |
| 6,282,161 B1 | * | 8/2001 | Son et al. | ................. 369/53.19 |
| 6,418,104 B1 | * | 7/2002 | Sato et al. | ................ 369/53.19 |
| 6,556,519 B1 | * | 4/2003 | Shiomi | ....................... 369/30.8 |
| 6,751,182 B1 | * | 6/2004 | Shiomi et al. | ........... 369/219.1 |

FOREIGN PATENT DOCUMENTS

JP    11-003531 A  *  1/1999

* cited by examiner

Primary Examiner—Hoa T. Nguyen
Assistant Examiner—Kim-Kwok Chu
(74) Attorney, Agent, or Firm—Rader Fishman & Grauer PLLC; Ronald P. Kananen

(57) ABSTRACT

A disk drive apparatus for recording (writing) and/or reproducing (reading) information on an optical disk by rotating the optical disk, and adjusting the tilt angle of an optical pickup device with respect to the optical disk. A spindle chassis rotationally supports a turntable on which the optical disk is placed. A pickup chassis, rotationally supported on said spindle chassis, movably supports an optical pickup device that writes and/or reads the information to/from the optical disk and is movable toward and away from the turntable. A tilt mechanism adjusts the tilt angle of the optical pickup device with respect to the optical disk by rotating the pickup chassis with respect to the spindle chassis.

16 Claims, 23 Drawing Sheets

FIG. 21 t1 Rotor Positional Deviation When Stopped Between A+ and B+ Phases 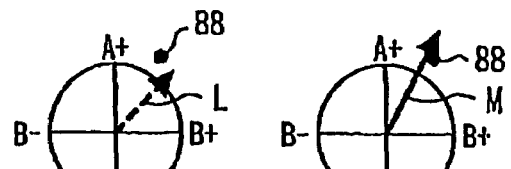

t2 Rotor Positional Deviation When Stopped at B+ Phase 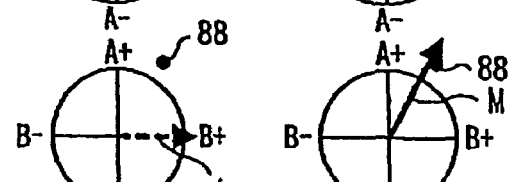

t3 Rotor Positional Deviation When Stopped Between A- and B+ Phases 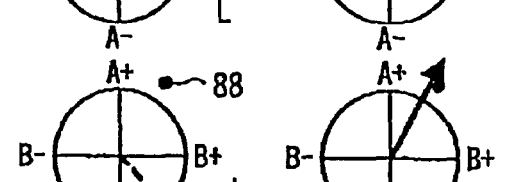

t4 Rotor Positional Deviation When Stopped at A- Phase 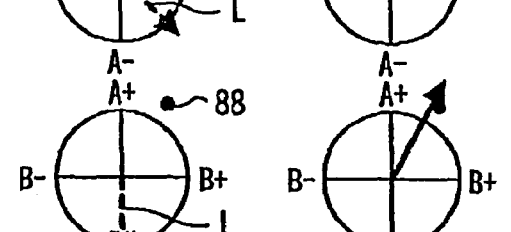

t5 Rotor Positional Deviation When Stopped Between A- and B- Phases 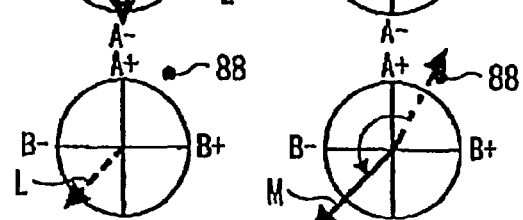

t6 Rotor Positional Deviation When Stopped at B- Phase 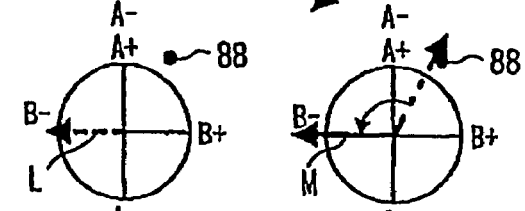

t7 Rotor Positional Deviation When Stopped Between A+ and B- Phases 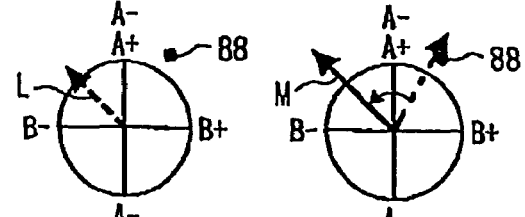

t0 Rotor Positional Deviation When Stopped at A+ Phase 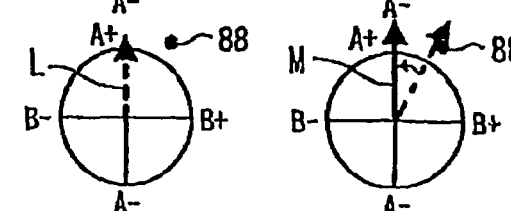

Electrical Angle Phase    Rotor Phase

APPARATUS AND METHOD FOR ADJUSTING THE TILT ANGLE OF AN OPTICAL PICKUP DEVICE

BACKGROUND OF THE INVENTION

1. Field of the Invention

The present invention relates to a disk recording and/or reproducing apparatus and a disk recording and/or reproducing method for recording (writing) and/or reproducing (reading) an information signal by rotating an optical disk and moving an optical pickup device along the information recording surface of the optical disk. More particularly, the invention relates to a tilt mechanism and method for adjusting the tilt angle of an optical pickup device with respect to an optical disk.

2. Description of Related Art

Hitherto, a disk recording and/or reproducing apparatus for recording and/or reproducing an information signal to/from an optical disk or magneto-optical disk, is generally known. In such a device, an optical disk is typically placed horizontally on a turntable. The turntable is attached to the rotary shaft of a spindle motor and is rotated. Simultaneously, the information recording surface of the optical disk is vertically irradiated with a laser beam emitted from an optical head of an optical pickup device. By moving the optical head from the center of the optical disk to the outer side in the radial direction, an information signal is written onto the information recording surface or the information signal recorded on the information recording surface in advance is read.

In such a disk recording and/or reproducing apparatus, the information recording surface of the optical disk and the optical head of the optical pickup device have to be mounted within a predetermined tilt range. This is because the reproduction accuracy of the information signal largely depends on the tilt of the optical head. In this case, in order to perform high-density and high-accuracy recording and/or reproduction of the optical disk, it is desirable to set the optical axis of the objective lens of the optical head perpendicular to the information recording surface of the optical disk. However, since the tilt of the optical disk, perpendicularity of the spindle motor, and perpendicularity of the objective lens vary, it is difficult to set the optical axis of the objective lens precisely perpendicular to the information recording surface of the optical disk.

In a disk recording and/or reproducing apparatus using an optical disk such as a CD, or a CD-ROM or the like, an allowable range of a relative tilt angle between the optical disk and the objective lens is standardized to less than or equal to 1.2° (the standard tilt angle of the optical disk is less than or equal to 0.6° and the standard tilt angle of the spindle motor or the objective lens is less than or equal to 0.6°). By tilting the optical pickup device from the state where the optical disk is mounted at a predetermined position as a reference, the optical axis of the objective lens is adjusted to be within a predetermined tilt range.

A disk recording and/or reproducing apparatus having a known tilt operating mechanism is shown in FIG. 23. A disk recording and/or reproducing apparatus 1 has a spindle chassis 2, a pickup chassis 3, and a tilt operating mechanism. The spindle chassis 2 is a plate-shaped frame body having a somewhat rectangular shaped opening. The pickup chassis 3 is a plate-shaped frame body which is slightly smaller than the spindle chassis 2 and similarly has an opening. The tilt operating mechanism rotates the pickup chassis 3 with respect to the spindle chassis 2 on the basis of the torque of a motor. The pickup chassis 3 has a pair of shafts 3a protruded from both sides in the width direction, while the spindle chassis 2 is provided with a pair of bearings 2a rotatably supporting the shafts 3a. By the combination of the pair of bearings 2a and the pair of shafts 3a, the pickup chassis 3 is supported by the spindle chassis 2 so as to be rotatable in the longitudinal direction.

The tilt operating mechanism 4 is provided on one side in the longitudinal direction of the spindle chassis 2. The pickup chassis 3 is rotatably operated in the longitudinal direction of the spindle chassis 2 by the operation of the tilt operating mechanism 4. On the other side in the longitudinal direction of the spindle chassis 2, a spindle motor 5 is fixed with its rotary shaft facing upward. A turntable 6, on which an optical disk is placed, is integrally attached to the rotary shaft of the spindle motor 5.

A guide shaft 3b and a guiding part (not shown) are attached so as to extend in the longitudinal direction in parallel to the pickup chassis 3 at a predetermined interval. The guide shaft 3b and the guide part slidably support a sliding member 8 of an optical pickup device 7. A rack (not shown) is fixed to the sliding member 8 and a gear, positioned at an end of a head feeding mechanism 9, engages with the rack. The head feeding mechanism 9 is driven and the rotary motion is transmitted to the sliding member 8, thereby moving the optical pickup device 7 toward or away from the turntable 6.

A tilt sensor 10, for sensing the distance from the information recording surface, is mounted on the sliding member 8. The tilt sensor 10 emits light toward the information recording surface and receives the light reflected by the information recording surface, thereby sensing a warp of the optical disk. The tilt operating mechanism 4 controls the tilt of the pickup chassis 3, on the basis of the sensing result of the tilt sensor 10, so as to minimize an error signal generated due to the warp of the optical disk. The tilt of the pickup chassis 3 is thereby changed and a tilt of the optical axis of the optical head 7a of the optical pickup device 7 with respect to the tilt of the information recording surface of the optical disk can be adjusted. Thus, when a disk recording and/or reproducing apparatus uses the tilt sensor 10, it is unnecessary to know a neutral point (mechanism center position) of the tilt operation.

A conventional disk recording and/or reproducing apparatus that includes a tilt sensor 10 to detect the optical disk warp has a high cost because of the tilt sensor 10. Moreover, the tilt control of the optical pickup device 8 is complicated, and the disk driving apparatus 1 is accordingly large. Further, since the tilt operating mechanism 4 has a tilt operation angle of about ±1°, there is also a problem that the mounting accuracy of the tilt sensor 10 has to be controlled rigorously.

SUMMARY OF THE INVENTION

It is therefore an object of the present invention to provide a disk recording and/or reproducing apparatus and a disk recording and/or reproducing method that can solve the above-mentioned drawbacks by enabling the tilt operation to be performed using a tilt operating mechanism and method, without using a tilt sensor.

In one aspect of the present invention, there is provided a disk recording and/or reproducing apparatus comprising a spindle chassis, a pickup chassis, a tilt mechanism, and a control circuit. The spindle chassis rotatably supports a turntable on which an optical disk to/from which an information signal is recorded and/or reproduced is placed. The pickup chassis is rotatably supported by the spindle chassis, and movably supports an optical pickup device for writing and/or reading the information signal to/from the optical disk and being movable toward and away from the turntable. The tilt mechanism adjusts the tilt of the optical pickup device with respect to the optical disk by rotating the pickup chassis with respect to the spindle chassis. The tilt mechanism includes a stepping motor for rotating the pickup chassis with respect to the spindle chassis. The control circuit drives the stepping motor to set the tilt of the pickup chassis to a predetermined neutral position.

BRIEF DESCRIPTION OF THE DRAWINGS

In the following detailed description, reference will be made to the attached drawings in which:

FIG. 21 is an explanatory diagram showing the relation between the stopper position and the rotor stop position in one rotation of an electrical angle of the tilt motor by the tilt driving circuit in the disk driving apparatus according to the invention.

DETAILED DESCRIPTION OF THE PREFERRED EMBODIMENTS

FIGS. 1 to 21 show an embodiment of the disk driving apparatus for a disk recording and/or reproducing apparatus according to one embodiment of the present invention.

Figure 1:
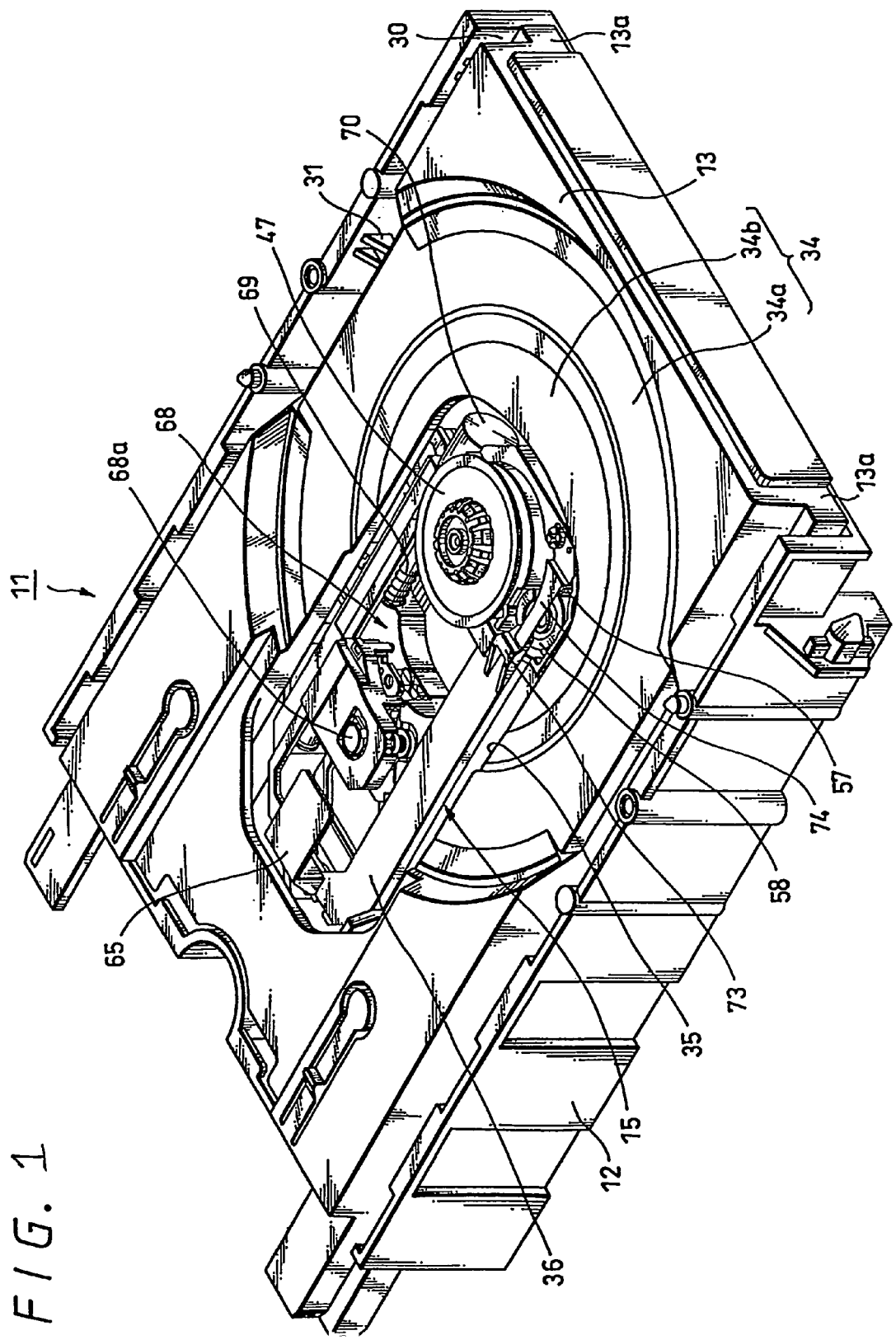
FIG. 1 is a perspective view showing the appearance of a disk drive apparatus according to an embodiment of the present invention.
Figure 2:
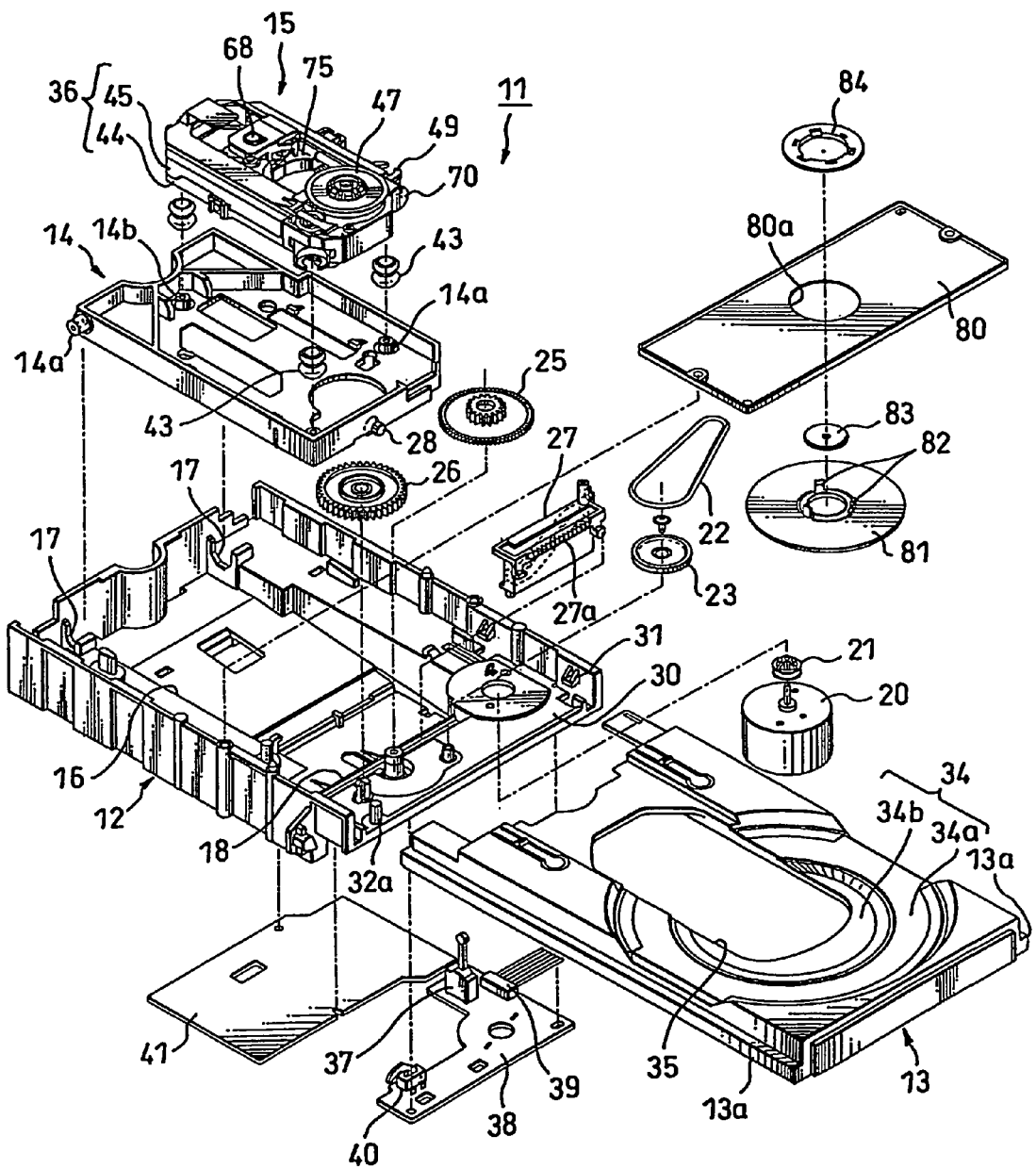
FIG. 2 is an exploded perspective view of the disk driving apparatus of the invention shown in FIG. 1.

As illustrated in FIGS. 1 and 2, a disk driving apparatus 11 comprises a main chassis 12, a disk tray 13, a base holder 14, and a base unit 15. The main chassis 12 is box-shaped and is opened at its top and front faces. The disk tray 13 is inserted into, and taken out from, the front opening of the main chassis 12. The base holder 14 is housed and rotatably supported in a recessed part in the main chassis 12. The base unit 15 is resiliently supported by the base holder 14.

Figure 3:
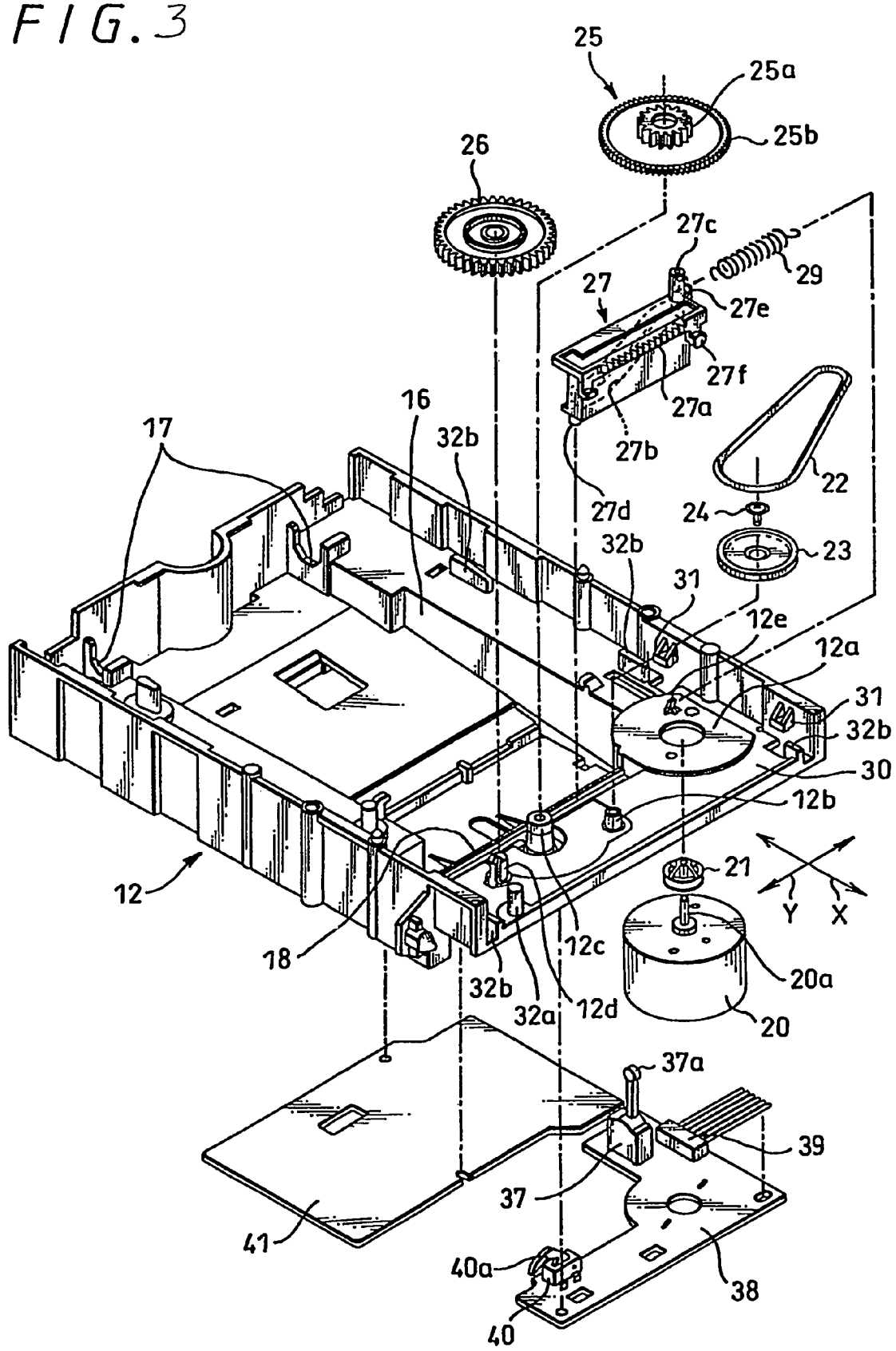
FIG. 3 shows the main part of FIG. 2 and is a perspective view of a main chassis and so on of the disk driving apparatus of the invention.

The main chassis 12 is a shallow rectangular box body, as illustrated in FIG. 3, and has a substantially rectangular-shaped recessed part 16 extending to the rear end in the center part of the bottom surface. The bottom surface of the recessed part 16 is sloped, thus the front portion is lowered. At the rear end, in the front-to-rear direction X, a pair of bearing parts 17, 17 are provided. The bearings 17, 17 each open upwardly and are located at both ends of the edge extending in the lateral direction Y which horizontally perpendicularly crosses the front/rear direction X. A pair of shafts 14a, 14a, provided on both sides of the rear end of the base holder 14, are rotatably supported by the pair of bearing parts 17 and 17, respectively. At the front end of the recessed part 16, a guide projection 18 and an elongated hole 19, each of which extend in the lateral direction Y and are parallel to each other, are provided.

A motor seat 12a is formed on one side at the front end of the bottom surface surrounding the recessed part 16 of the main chassis 12. A loading motor 20 is screwed to the seat 12a on the back surface side of the main chassis 12. A rotary shaft 20a of the loading motor 20 penetrates the bottom surface of the main chassis 12 and is projected into the inside of the recessed part 16. A driving pulley 21 is fixed to the rotary shaft 20a. One end of a rubber belt 22 is stretched on the driving pulley 21, and the other end of the rubber belt 22 is stretched over a follower or driven pulley 23, disposed almost in the center at the front end of the bottom surface.

The driven pulley 23 is rotatably supported by a first supporting shaft 12b. The first supporting shaft 12b is formed upright at the front end of the bottom surface of the main chassis 12, and is fixed by a set screw 24 screwed on the first supporting shaft 12b. On the under surface of the driven pulley 23, a gear (not shown) is integrally formed and engaged with a middle part gear 25b of an intermediate gear 25. The intermediate gear 25 is rotatably supported by a second supporting shaft 12c, which is similarly provided upright at the front end of the bottom surface. A driving gear 26, rotatably supported by a third supporting shaft 12d, similarly provided upright at the front end of the bottom surface, is engaged with an upper gear 25a, provided on the top face of the middle part gear 25b of the intermediate gear 25.

Figure 10:
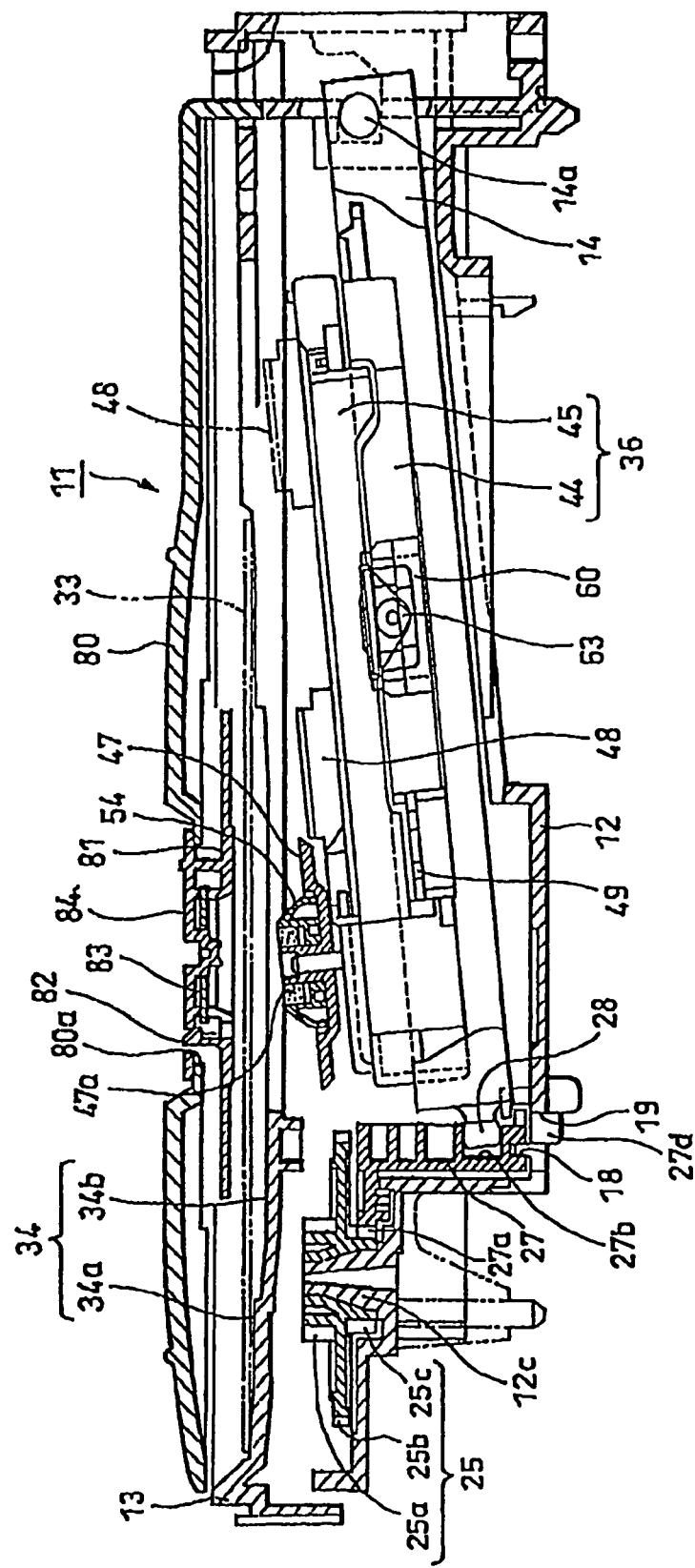
FIG. 10 is a cross section in the tray conveying direction of the disk driving apparatus of the invention, showing an unloading state where the turn table is lowered.

A lower gear 25c is integrally formed on the under surface of the middle part gear 25b of the intermediate gear 25. As shown in FIG. 10, a rack 27a of a chuck cam 27 is engaged with the lower gear 25c. The chuck cam 27 is a block member of a laterally-long rectangle and the rack 27a, protruded on one surface side, is formed on the chuck cam 27. A guide groove extending in the longitudinal direction is formed on the under surface of the chuck cam 27. Further, on the surface opposite to the rack 27a, a cam groove 27b is provided for moving the base holder 14 in the vertical direction.

Figure 11:
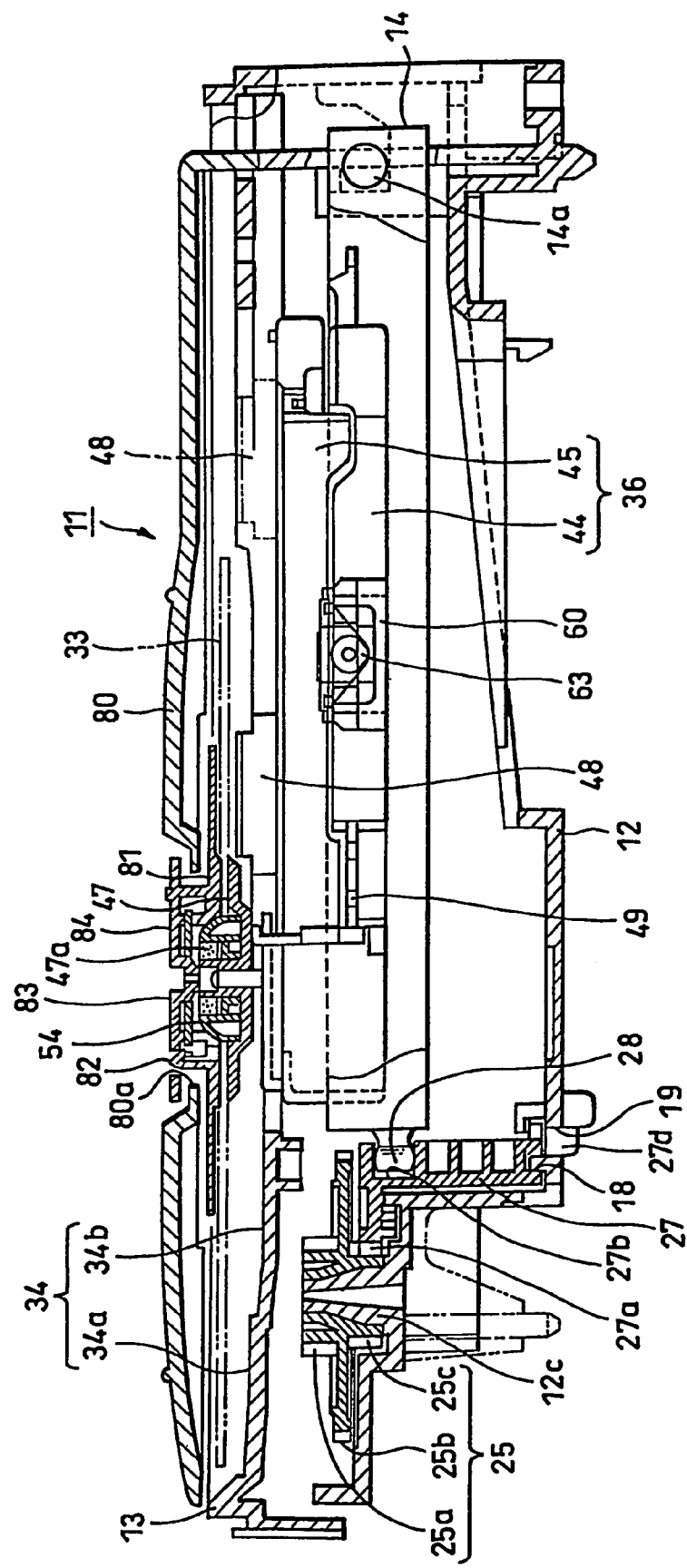
FIG. 11 is a cross section in the tray conveying direction of the disk driving apparatus of the invention, showing a loading state where the turn table is lifted.

The cam groove 27b has upper and lower horizontal parts set on both ends in the longitudinal direction, and an oblique surface set in an intermediate position so as to obliquely communicate the upper and lower horizontal parts. A cam pin 28, provided at the front end surface of the base holder 14, projects forwardly and slidably fits in the cam groove 27b. Operation pins 27c and 27d, for manually sliding the chuck cam 27, are attached to the top and under surfaces of the chuck cam 27. As shown in FIG. 11, the lower operation pin 27d passes through the elongated hole 19 of the main chassis 12 and is projected from the rear surface side.

A spring receiving member 27e is provided at the proximal part of the upper operation pin 27c of the chuck cam 27. One end of a helical extension spring 29 is retained by the spring receiving member 27e. The other end of the helical extension spring 29 is retained by the spring receiving member 12e provided on the main chassis motor seat 12a. By the spring force of the helical extension spring 29, the chuck cam 27 is continuously biased toward the main chassis motor seat 12a. Accordingly, when the chuck cam 27 is positioned toward the main chassis motor seat 12a, the cam pin 28 is in the lower horizontal part of the cam groove 27b and the base holder 14 is inclined forward. On the other hand, when the chuck cam 27 is positioned away from the main chassis motor seat 12a, the cam pin 28 is in the upper horizontal part of the cam groove 27b and the base holder 14 is in an almost horizontal state.

The front opening of the main chassis 12 serves as a tray port 30. A plurality of tray guides 31 is provided on the inner surface of each side piece on both sides of the tray port 30. A plurality of guide pins 32a and 32b are provided on the bottom surface piece. A pair of guide rails 13a and 13a, provided on both right and left sides of the disk tray 13, are regulated by the tray guides 31 and the guide pins 32a and 32b. Thus the disk tray 13 is movably held in the front/rear direction X with respect to the main chassis 12 and is ejectable from the tray port 30.

Figure 4:
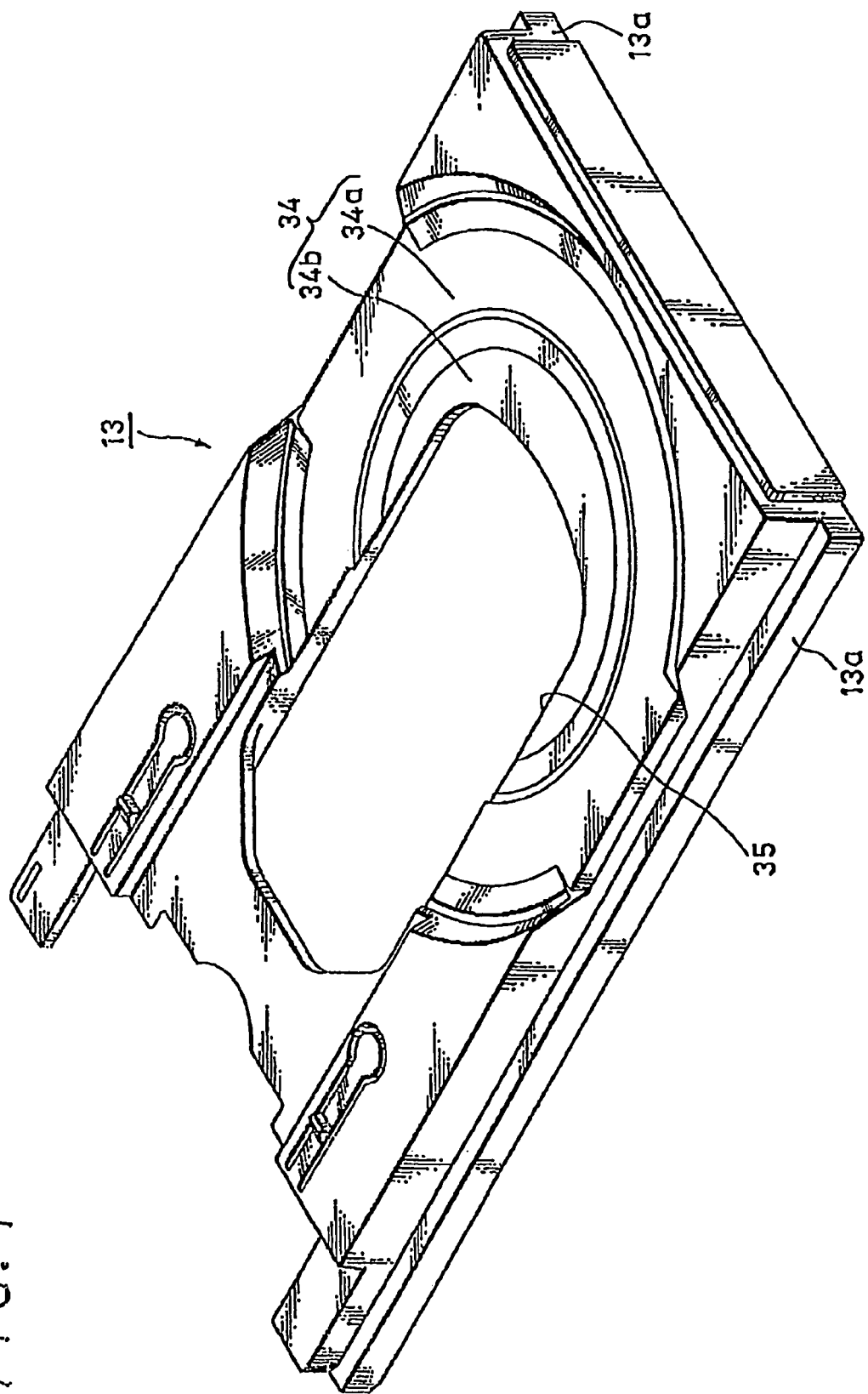
FIG. 4 is a perspective view showing a disk tray of the disk driving apparatus of the invention.

As shown in FIG. 4, the disk tray 13 has a disk housing part 34. This disk housing part 34 is a circular recessed part in which an optical disk 33, such as a CD, a CD-ROM or the like, can be housed. The disk tray 13 also includes an elongated opening 35 extending rearward from the center part of the disk housing part 34 along the tray center. The disk housing part 34 has a large diameter part 34a, on which a 12 cm optical disk 33 may be placed. The disk housing part 34 also includes a small diameter part 34b, which is a recessed part formed in the center of the large diameter part 34a, on which an 8 cm optical disk 33 may be placed.

The opening 35 of the disk tray 13 extends from a part nearer to the front end than the center of the small diameter part 34b of the disk housing part 34, to the outside of the disk housing part 34. The size and shape of the opening 35 are set so that it can receive the entire upper part of the base unit 15. At the right and left side edges of the disk tray 13, the pair of right and left guide rails 13a and 13a, extending in the front/rear direction in parallel, are provided.

Although not illustrated, a rack and a guide groove which extend in parallel to the guide rails 13a, are integrally formed on one side of the under surface of the disk tray 13. The driving gear 26, supported by the main chassis 12, engages with the rack and the disk tray 13 is moved forward or backward by the torque of the driving gear 26. The length of the rack is set so that the rack disengages the driving gear 26 when the disk tray 13 is moved to a position immediately in front of the rear end. Further, the guide pin 32a, formed upright in the front part of the main chassis 12, is slidably fit in the guide groove. The guide pin 32a also regulates the movement of the disk tray 13, so that the disk tray 13 is moved straight in the front/rear direction X.

The movement in the front/rear direction of the disk tray 13 is detected by a tray feed detecting switch 37. The tray feed detecting switch 37 functions to determine whether the disk tray 13 is moved in the ejecting direction or in the loading direction. The tray feed detecting switch 37 is fixed to a printed wiring board 38 which is attached to the under surface of the main chassis 12. An operator 37a of the tray feed detecting switch 37 is passed through a through hole opened in the main chassis 12 and projected on a movement locus of the disk tray 13.

A connection terminal 39 for supplying electric power to the loading motor 20 and other components is attached to the printed wiring board 38. A cam detection switch 40 for detecting the operation of the check cam 27 is also attached to the printed wiring board 38. An operator 40a of the cam detection switch 40 is disposed on the movement locus of an input part 27f, provided for the check cam 27. When the check cam 27 is moved away from the main chassis motor seat 12a a predetermined amount, the cam detection switch 40 is closed. Reference numeral 41, shown in FIG. 3, denotes a cover plate attached to the under surface of the main chassis 12.

Figure 5:
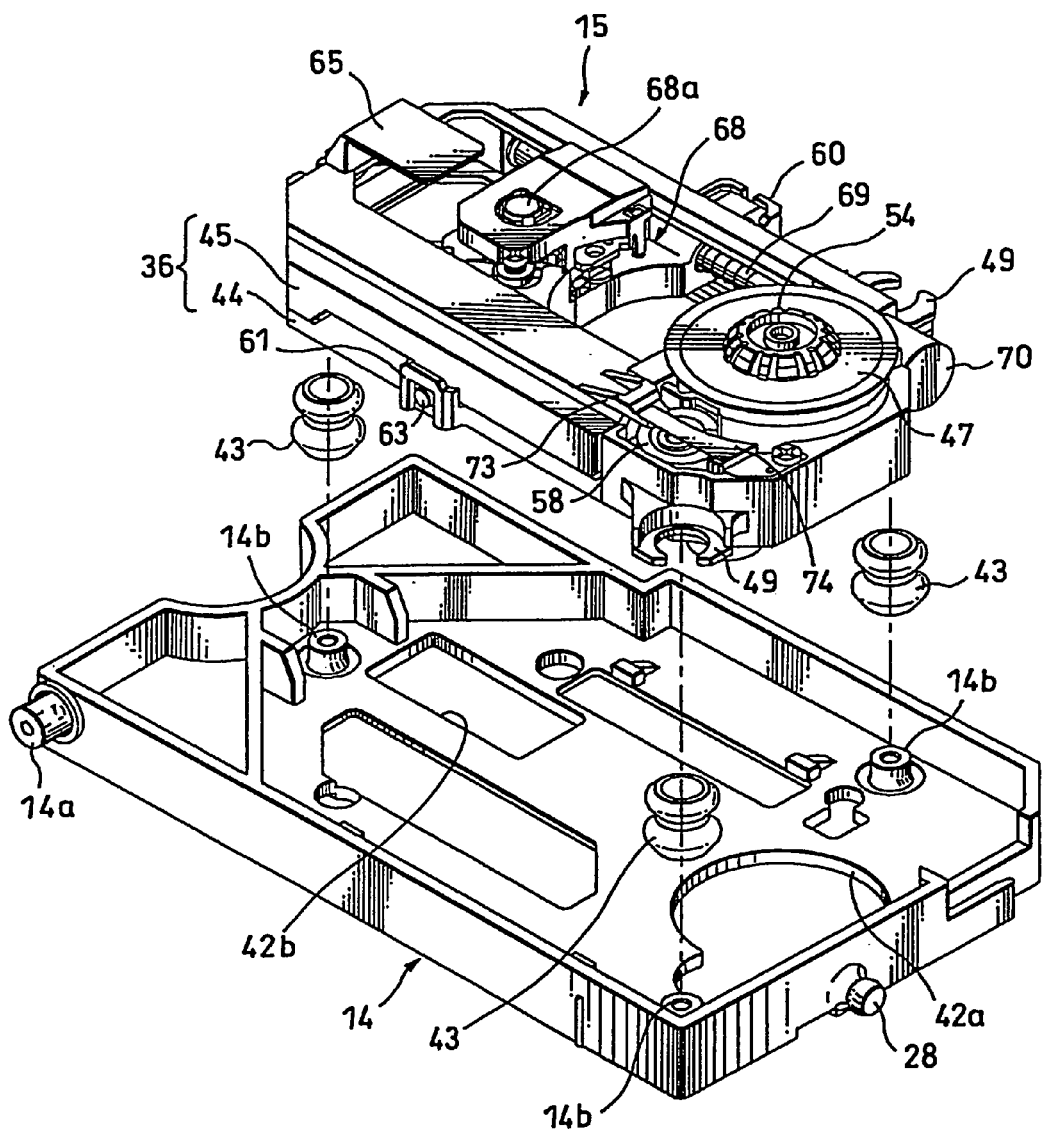
FIG. 5 illustrates a base unit of the disk driving apparatus of the invention and is a perspective view of a state where a biaxial cover is disassembled.
Figure 6:
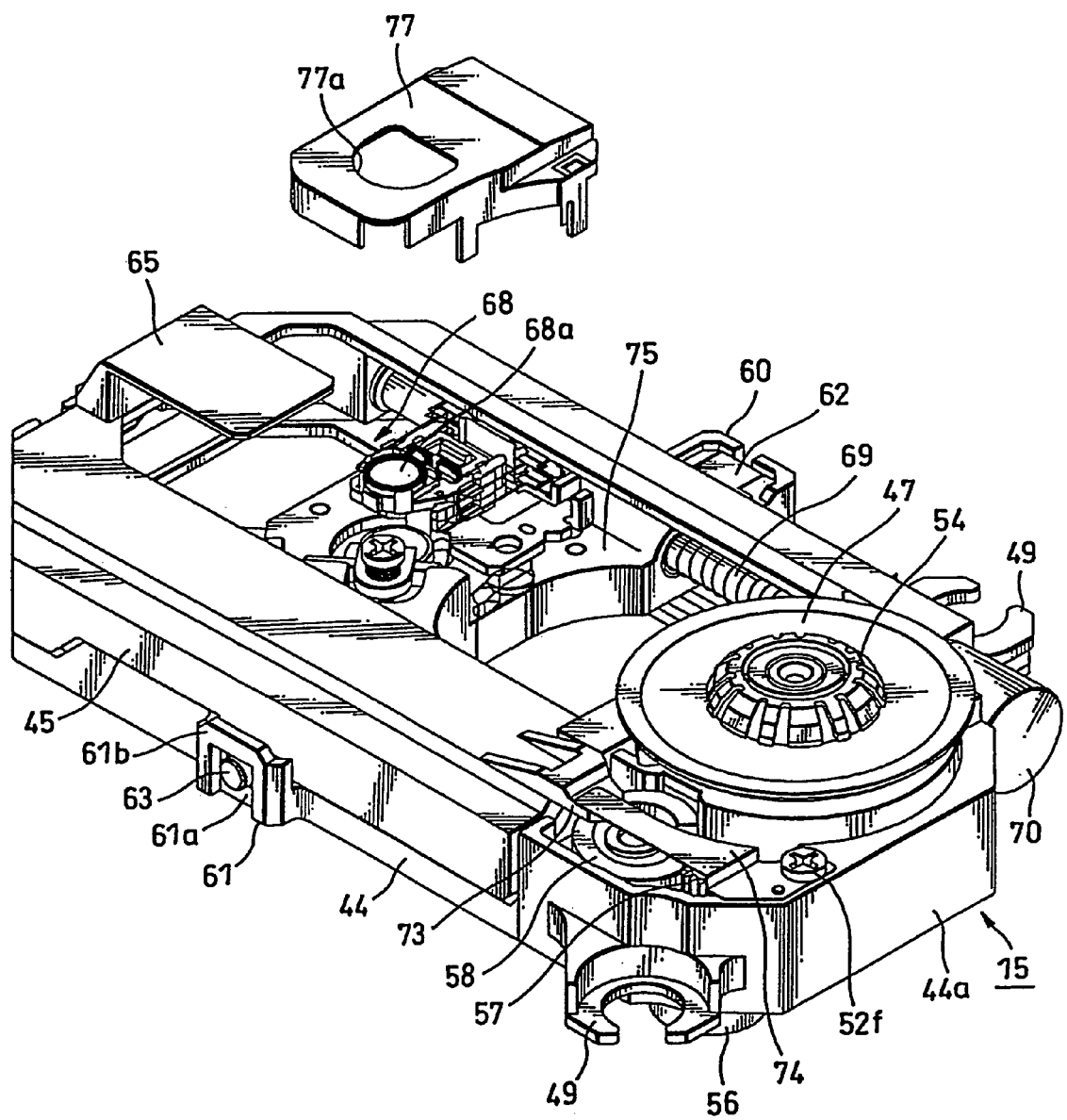
FIG. 6 shows the base unit of the disk driving apparatus of the invention and is a front view with a cross section of a turntable.
Figure 7:
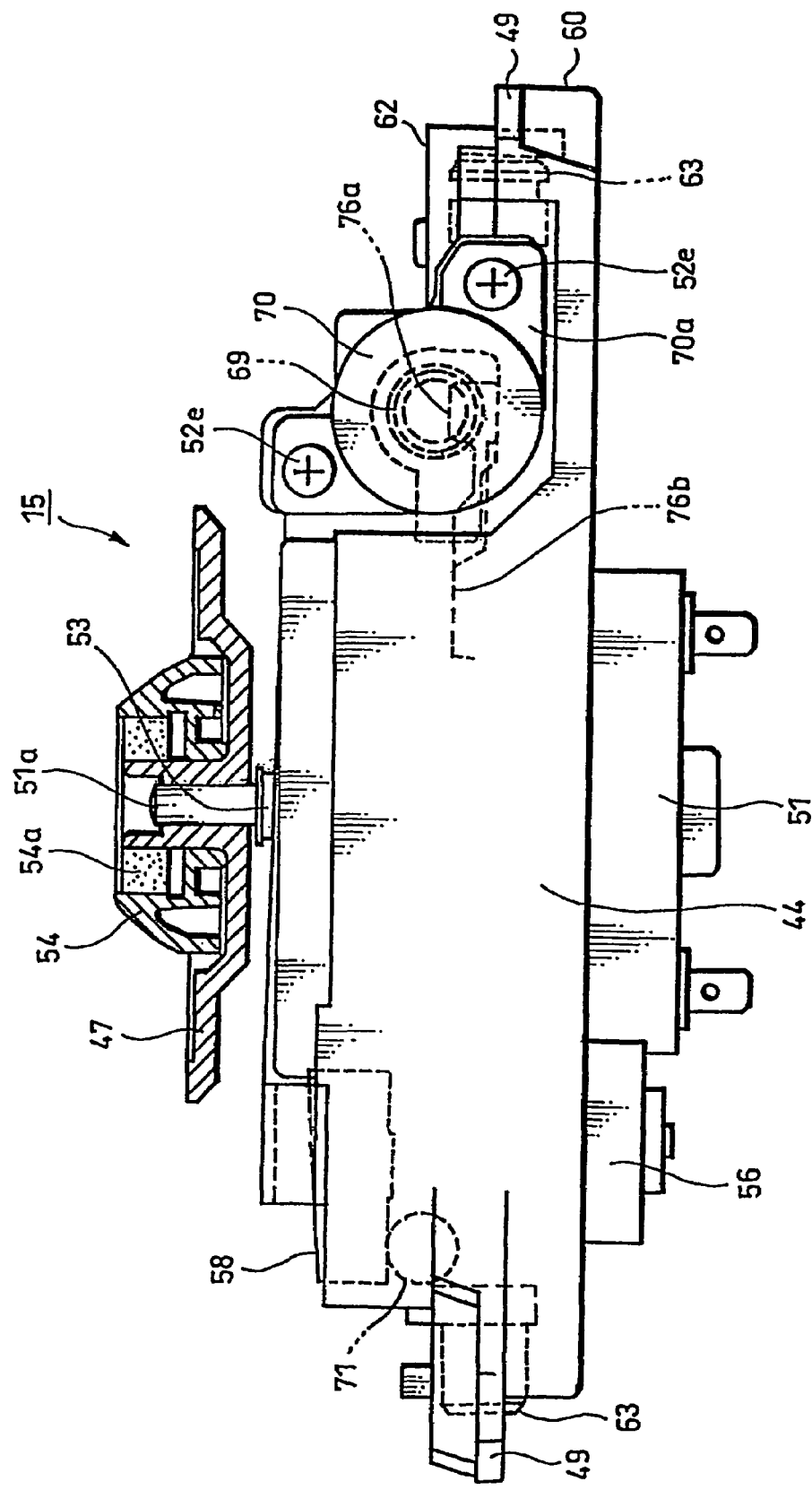
FIG. 7 shows the base unit of the disk driving apparatus of the invention and is a front view with a cross section of a turntable.

The base holder 14, housed in the recessed part 16 of the main chassis 12, has a shape as shown in FIG. 5. Specifically, the base holder 14 is a shallow box member having a somewhat rectangular shape. The above-described cam pin 28 is attached to the front face plate and the pair of shafts 14a are provided at the rear ends of the right and left side plates. On the bottom plate of the base holder 14, an opening hole 42a, used to avoid the contact with the spindle motor, and an opening hole 42b, through which a flexible printed wiring board and the like are passed, are provided. Projections 14b, for positioning and resiliently supporting the base unit 15, are provided at three positions on the bottom plate. An elastic insulator 43 is attached to each of the projections 14b.

The base unit 15 has the construction illustrated in FIGS. 5 to 8. Specifically, the base unit 15 includes a spindle chassis 44 and a pickup chassis 45. The spindle chassis 44 rotatably supports the turntable 47. The pickup chassis 45 movably supports an optical pickup device 48 for reading the information from the optical disk 33 placed on the turntable 47. The spindle chassis 44 and the pickup chassis 45 comprise a base chassis 36.

Figure 8:
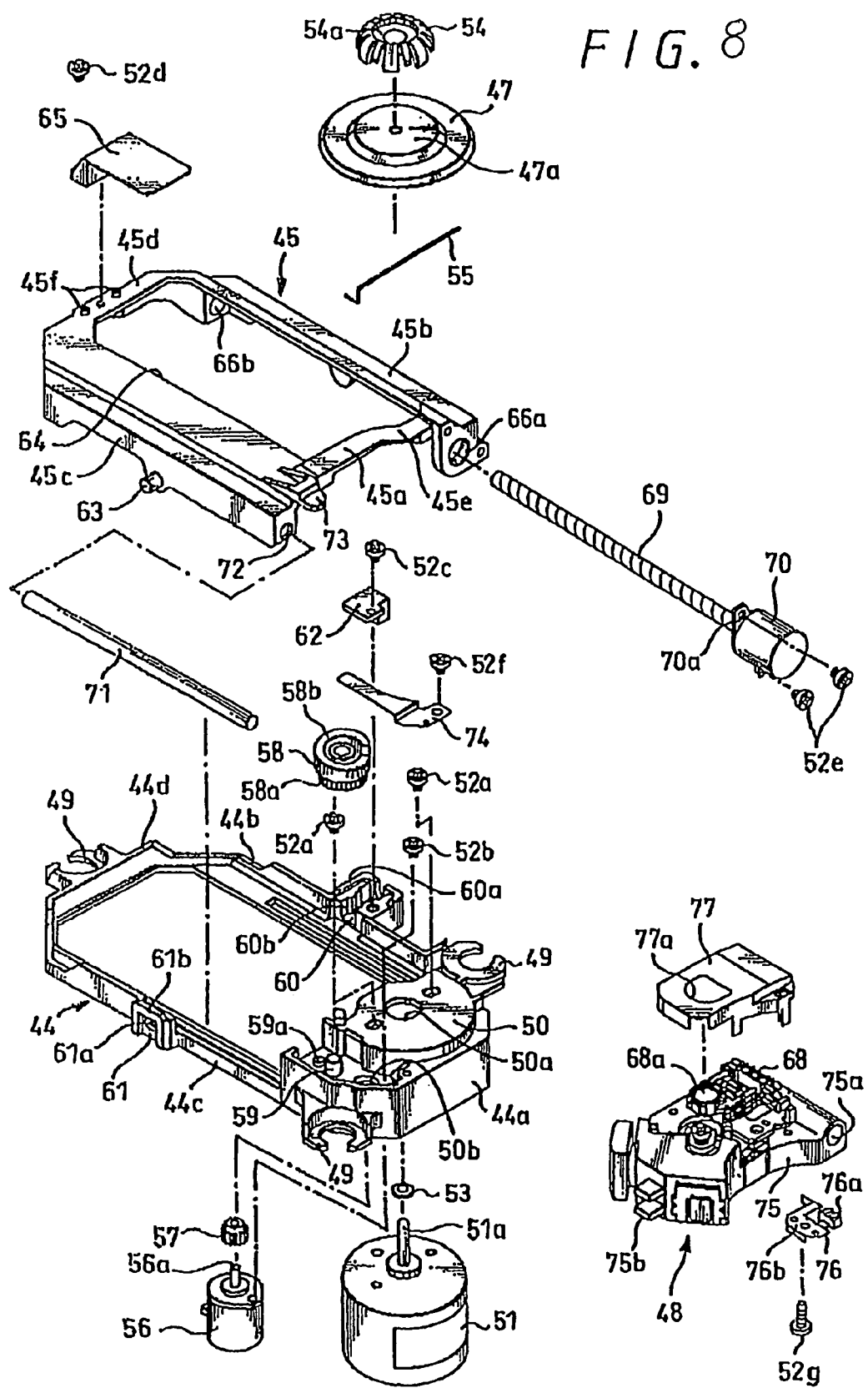
FIG. 8 is an exploded perspective view of the base unit of the disk driving apparatus of the invention.

As shown in FIG. 8, the spindle chassis 44 is a frame member having a front piece 44a, right and left side pieces 44b and 44c, and a rear piece 44d. The height of the front piece 44a is set to be almost twice as high as each of the other pieces. Supporting parts 49, for supporting the insulators 43, are provided at a total of three positions. One is provided at a corner of the front piece 44a, one at the front end of the side piece 44b, and one near the center part of the rear piece 44d. Each supporting part 49 has a nail having a C-shaped cross section, and the constricted part of the insulator 43 is inserted in the supporting part 49. A fixing screw (not shown) is inserted into the insulator 43 from above and is screwed into a screw hole formed in the top face of the projection 14b. Thus, the base holder 14 resiliently supports the base unit 15 via the three insulators 43.

A motor mounting seat 50 is formed by upwardly expanding a part of the front piece 44a of the spindle chassis 44. A spindle motor 51 is attached to the inner side of the motor mounting seat 50 by a plurality of fixing screws 52a. The rotary shaft 51a of the spindle motor 51 is passed through a through hole 50a of the motor mounting seat 50 and projected upward from the spindle chassis 44.

An offset washer 53 is fitted onto the rotary shaft 51a of the spindle motor 51, and the turntable 47 is fixed to the offset washer 53. A ring fixing part 47a is formed projectingly in the center of the top surface of the turntable 47, and a chucking ring 54 is fit into the ring fixing part 47a. A magnet 54a is embedded in the chucking ring 54 so as to be concentric with the central hole. By fitting the chucking ring 54 into the central hole of the optical disk 33, the optical disk 33 is positioned on the turntable 47.

Figure 9:
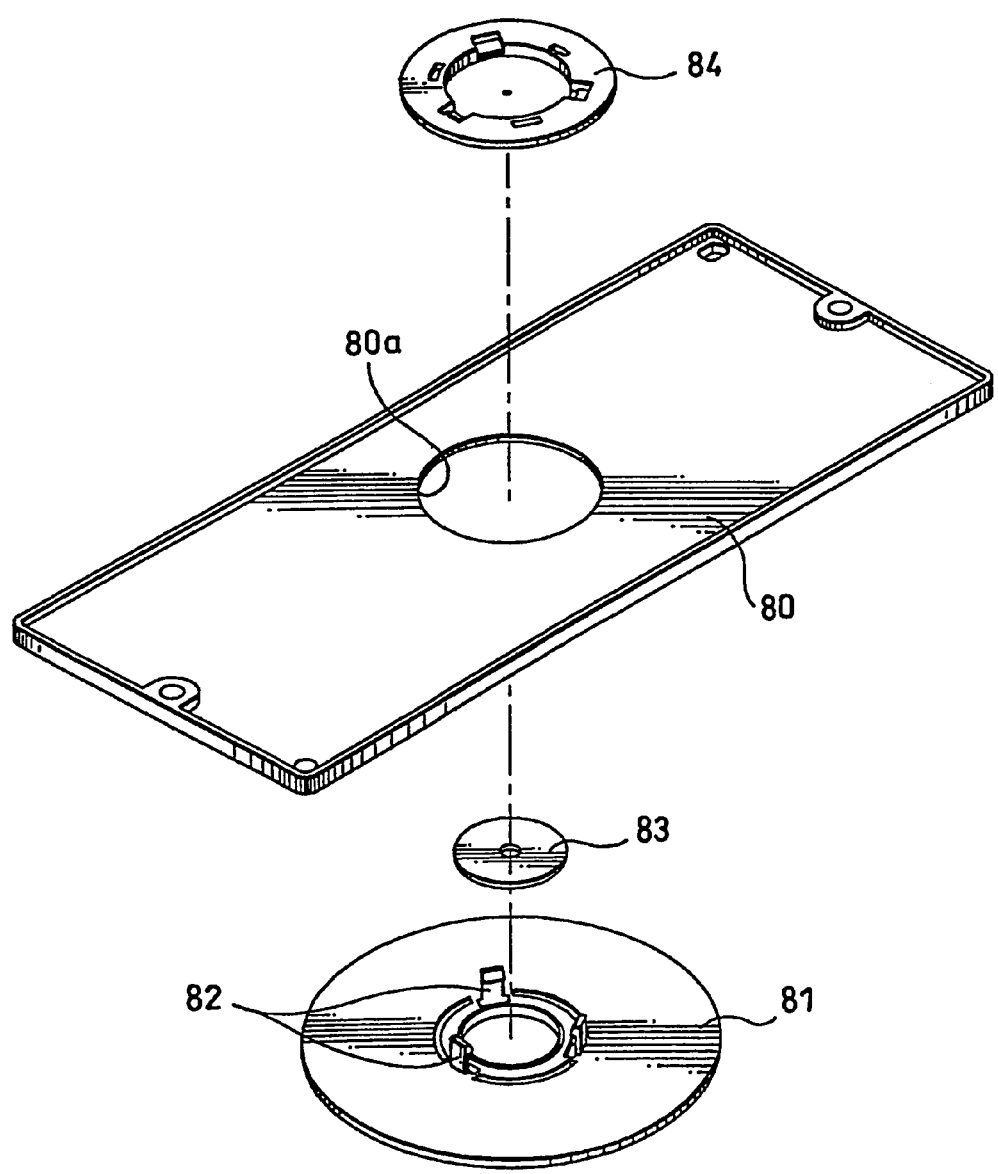
FIG. 9 shows the main part of FIG. 3 and is a perspective view illustrating a chuck plate and the like of the disk driving apparatus of the invention.

Reference numeral 55 in FIG. 9 indicates an offset spring for regulating the movement of the rotary shaft 51a in the axial direction. The offset spring 55 is set so as to cross the motor mounting seat 50. The intermediate part of the offset spring 55 is fit in the offset washer 53 and both ends thereof are retained by the motor mounting seat 50.

A tilt motor 56 is mounted next to the spindle motor 51 on the inside of the motor mounting seat 50. The tilt motor 56 serves as the driving force for the tilt operation mechanism. The tilt motor 56 can be a two-pole, two-phase stepping motor. The tilt motor 56 is mounted on the inside of the motor mounting seat 50 and is fixed with a single fixing screw 52b. The rotary shaft 56a of the tilt motor 56 is passed through a hole 50b of the motor mounting seat 50 and is projected upward from the spindle chassis 44. The rotary shaft 56a of the tilt motor 56 is fixedly fit in a tilt gear 57, and a gear part 58a of a tilt cam 58 engages with the tilt gear 57.

The tilt cam 58 is one of the members used to rotate the pickup chassis 45. The tilt cam 58 has a gear part 58a provided in the lower part and a cam face 58b formed on the upper end surface. The cam face 58b has an inclined part extended over a 360° spiral. The pickup chassis 45 is rotated in the vertical direction, that is, tilted by an amount corresponding to the stroke h in the height direction of the cam surface 58b. The tilt cam 58 is rotatably supported by a supporting shaft 59 provided on the top surface of the front piece 44a of the spindle chassis 44. Proximate the supporting shaft 59, a stopper boss 59a, similarly projected from the top surface of the front piece 44a, is provided.

Figure 14:
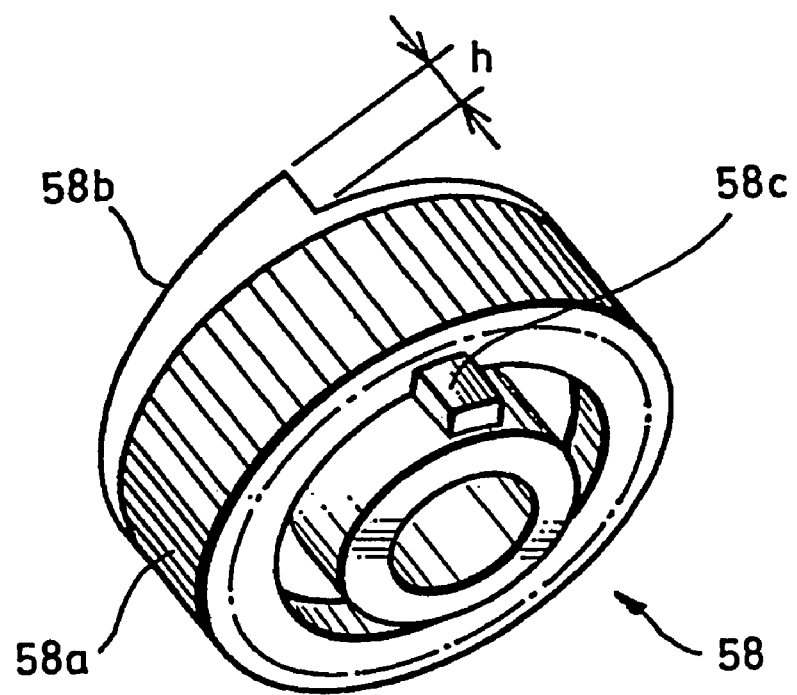
FIG. 14 is a perspective view of a tilt cam of a tilt operating mechanism in the disk driving apparatus according to the invention, which is seen from a rib part side.
Figure 15:
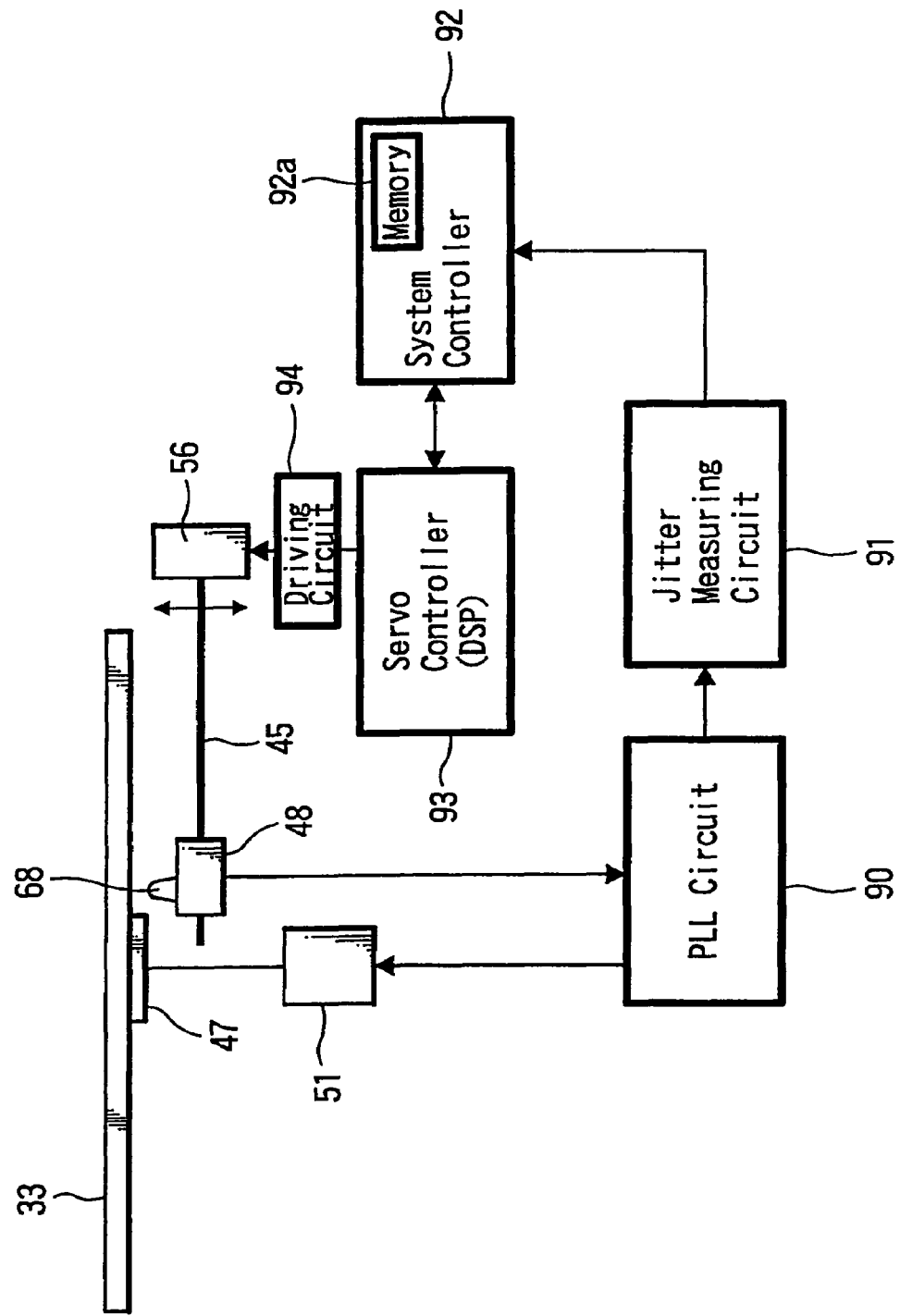
FIG. 15 is a block diagram showing a schematic construction of the disk driving apparatus of the invention.

As shown in FIG. 14, a rib 58c, formed on the lower surface of the tilt cam 58, comes into contact with the stopper boss 59a. The positional relation between the rib 58c of the tilt cam 58 and the stopper boss 59a is set so that a cam piece 73 (described later) moves to its highest and lowest positions, depending upon which side of the stopper boss 59a that rib 58c contacts. For example, when rib 58c rotates in one direction in association with the rotation of the tilt cam 58 and comes into contact with one surface of the stopper boss 59a, cam piece 73 is in the highest position. Conversely, when the rib 58c is rotated in the opposite direction and comes into contact with the other surface of the stopper boss 59a, cam piece 73 is in the lowest position. The operation of the tilt motor 56 for controlling the rotating operation of the tilt cam 58 will be described in detail further below.

The side pieces 44b and 44c and the rear piece 44d of the spindle chassis 44 are formed so as to have an L-shaped cross section along almost the full length in the longitudinal direction. This cross sectional shape enhances the rigidity of the whole spindle chassis 44. A pair of bearings 60 and 61 are formed near the longitudinal center of the side pieces 44b and 44c and project in the lateral direction. A pair of rotary shafts 63, provided for the pickup chassis 45, are rotatably held by the bearings 60 and 61.

Bearing 60 has a box-shaped periphery 60a which projects outwardly and is opened upwardly. Bearing 60 also includes a V-shaped receiving face 60b formed on the inside of the box-shaped edge or periphery 60a. One of the rotary shafts 63 is placed on the receiving face 60b and is pressed from the above by a pressing piece 62, thereby securely fitting the rotary shaft 63. The pressing piece 62 is fixed to the box-shaped periphery 60a by a fixing screw 52c. The other bearing 61 has a V-shaped receiving face 61a and a gate-shaped pressing piece 61b surrounding the receiving face 61a. The pressing piece 61b is formed integrally with the side piece 44c. By inserting the other rotary shaft 63 from the inside, the rotary shaft 63 is rotatably held between the pressing piece 61b and the receiving face 61a.

The pickup chassis 45 has nearly the same size and shape as that of the spindle chassis 44, except for the front piece 44a. More specifically, the pickup chassis 45 is a frame member having a front piece 45a which is disposed adjacent to, and on the rear side of, the spindle chassis front piece 44a. Pickup chassis 45 also includes a pair of right and left opposing side pieces 45b and 45c, and a rear piece 45d connected to the rear sides of the side pieces 45b and 45c. An opening 64 through which an optical head 68 of the optical pickup device 48 is passed, is provided on the inside of the frame member.

The side pieces 45b and 45c and the rear piece 45d of the pickup chassis 45, except for the front piece 45a, have an L-shaped cross section along most the length in the longitudinal direction. With such a cross section shape, the rigidity of the whole pickup chassis 45 is enhanced. The pair of rotary shafts 63 are projected near the center part in the longitudinal direction of both side pieces 45b and 45c. The height of each of the side pieces 45b and 45c and the rear piece 45d is set to be almost equal to that of the side piece 44b. Accordingly, by disposing the pickup chassis 45 so as to overlap the spindle chassis 44 at a predetermined position, the height of the overlapped part is almost the same as that of the front piece 44a of the spindle chassis 44.

The front piece 45a of the pickup chassis 45 has a plate-shape and connects the right and left side pieces 45b and 45c only on the top faces. The top face of the front piece 45a has an inclined face part 45e. Thus, side piece 45b is lower and is inclined in the lateral direction. The front piece 45a serves as the end edge part of the pickup chassis 45, which enters under the turntable 47. By forming the inclined face part 45e in the front piece 45a of the pickup chassis 45 as described above, the number of components can be reduced relative to that of the conventional base chassis, and the assembly is easier.

Positioning projections 45*f* are formed on the top face of the rear piece 45*d* of the pickup chassis 45. With the positioning projections 45*f*, a light shielding plate 65 is fixed on the rear piece 45*d* by a fixing screw 52*d*. The light shielding plate 65 has a nearly L-shaped cross section and covers an objective lens 68*a* of the optical pickup device 48, when it is moved to the rear side.

An insertion hole 66*a* is provided in the front end of pickup chassis side piece 45*b*, and a bearing 66*b* is provided at the rear end. A bearing member provided on a feed motor 70 is fitted in insertion hole 66*a*, and the tip of a feed shaft 69, inserted into insertion hole 66*a*, is rotatably supported by the bearing 66*b*. The feed shaft 69 serves as the rotary shaft of the feed motor 70. A spiral screw groove is formed on the outer peripheral surface of the feed shaft 69 and the feed shaft 69 itself serves as the rotor of the feed motor 70. The feed motor 70 is fixed to the front edge of the side piece 45*b*, so as to project forward from the pickup chassis 45 by fastening a bracket 70*a* with two fixing screws 52*e*.

On the inside of the other pickup chassis side piece 45*c*, a guide shaft 71 is attached so as to be parallel to the feed shaft 69. Consequently, the front and rear edges of the side piece 45*c* have a pair of insertion holes 72 opened in them. By inserting both ends of the guide shaft 71 into the insertion holes 72, both ends of the guide shaft 71 are supported by the pickup chassis 45.

Further, a cam piece 73, projecting toward the tilt cam 58, is provided at the upper front edge of the other side piece. A free end of a plate spring 74 is in press contact with the cam piece 73 and urges the cam piece 73, by the spring force, into press contact with the cam face 58*b* of the tilt cam 58. The fixing end of the plate spring 74 is fixed to the top face of the spindle chassis front piece 44*a* by a fixing screw 52*f*.

The optical pickup device 48, movably supported by the feed shaft 69 and the guide shaft 71, is guided by the shafts 69 and 71 so as to move toward or away from the turntable 47. The optical pickup device 48 has a sliding member 75 on which the optical head 68 is mounted. A bearing hole 75*a* is opened on one side of the sliding member 75 and the feed shaft 69 is slidably inserted into the bearing hole 75*a*. A rack part 76*a* of a sliding rack 76 attached to the under surface of the sliding member 75 engages with the screw groove of the feed shaft 69. The rack part 76*a* is formed integrally with a fixing piece 76*b* via a resilient piece. By fastening the fixing piece 76 with a fixing screw 52*g*, the sliding rack 76 is fixed to the sliding member 75. A bearing part 75*b* is formed on the other side of the sliding member 75 and the guide shaft 71 is slidably sandwiched by the bearing part 75*b*.

The feed shaft 69, the feed motor 71, and the sliding rack 76 comprise a head feeding mechanism for moving the optical pickup device 48. A speed reducing mechanism is comprised of the feed shaft 69 and the sliding rack 76. Further, a tilt operation mechanism for adjusting the tilt, by rotating the pickup chassis 45 with respect to the spindle chassis 44, comprises the tilt motor 56, the tilt gear 57, the tilt cam 58, the stopper boss 59*a*, the cam piece 73, and the plate spring 74.

The optical head 68 of the optical pickup device 48 has a biaxial actuator which can independently move the objective lens 68*a* in the focusing direction (vertical direction) and the tracking direction (lateral direction). Electromagnetic force is used as the sole driving force for the biaxial actuator. In the depicted embodiment, a plate spring type biaxial actuator is used. Obviously, other types of devices, such as wire supporting type, hinge type, and shaft sliding type devices can be us as a biaxial actuator. Reference numeral 77, shown in FIG. 9, denotes a biaxial cover that covers the biaxial actuator. A window 77*a* from which the objective lens 68*a* is exposed is opened in the biaxial cover 77.

As illustrated in FIG. 2, on the main chassis 12, a chuck holder 80 is attached so as to cross above the disk tray 13. As shown in FIG. 10, the chuck holder 80 is formed of a rectangular plate member which is thin and long in the lateral direction, and includes a through hole 80*a* opened near the center part in the longitudinal direction of the chuck holder 80. Three leg pieces 82 of a chuck plate 81 are loosely inserted in the through hole 80*a*. The three leg pieces 82 are disposed on a circular arc so that the peripheral surface thereof serves as a part of the circumference. A disc-shaped yoke plate 83, made of iron or the like, and attracted by the magnet 54*a* provided in the chucking ring 54, is housed on the inside of the leg pieces 82.

A yoke pressing plate 84 is attached to the tips of the leg pieces 82 that project upward through the through hole 80*a* of the chuck holder 80. By sandwiching the chuck holder 80 between the yoke pressing plate 84 and the chuck plate 81 with a predetermined gap, the chuck plate 81 can be moved in the direction which crosses perpendicularly to its plane direction within the range of the gap. By providing a gap between the through hole 80*a* and the three leg pieces 82, the chuck plate 81 can be moved in its plane direction within the range of the gap.

Although ABS resin is suitable as a material for each of the main chassis 12, the disk tray 13, and the base holder 14, obviously, other synthetic resins can be applied. A metal such as aluminum alloy or the like can be also used. PPS (polyphenylene sulfide) containing 65% glass fibers is suitable as a material for the spindle chassis 44 and the pickup chassis. Obviously, other synthetic resins can be used and, moreover, a metal such as aluminum alloy or the like can be also used.

A schematic construction of the tilt drive control system of the disk driving device 11 described above is shown in FIG. 15. By the torque of the spindle motor 51, the optical disk 33 placed on the turn table 47 is integrally rotated. The inclination of the optical head 68 of the optical pickup device 48, whose objective lens faces the information recording surface of the optical disk 33, is changed by the rotational operation of the pickup chassis 45 by the driving of the tilt motor 56. Information read from the information recording surface by the optical pickup device 48 is supplied to a PLL circuit 90. The PLL circuit 90 is a circuit for generating a synchronizing (sync) signal at basic periods in order to discriminate whether the code of a pulse signal obtained by shaping the detected information signal is "1" or "0".

A signal outputted from the PLL circuit 90 is supplied to a jitter measuring circuit 91. The jitter measuring circuit 91 is a circuit for measuring a jitter as a fluctuation in the time base direction of a digital signal, digitizing the magnitude of the fluctuation, and outputting the obtained digital value. When the jitter becomes worse, a code error occurs and the information signal cannot be read. Consequently, the jitter measuring circuit 91 is provided in order to prevent such a situation. A signal outputted from the jitter measuring circuit 91 is supplied to a system controller 92. The system controller 92 has therein a memory 92*a* and predetermined information is recorded in the memory 92*a* in advance and new information is written into the memory 92*a* as necessary. The system controller 92 is used to control the disk driving apparatus 11.

Figure 12:
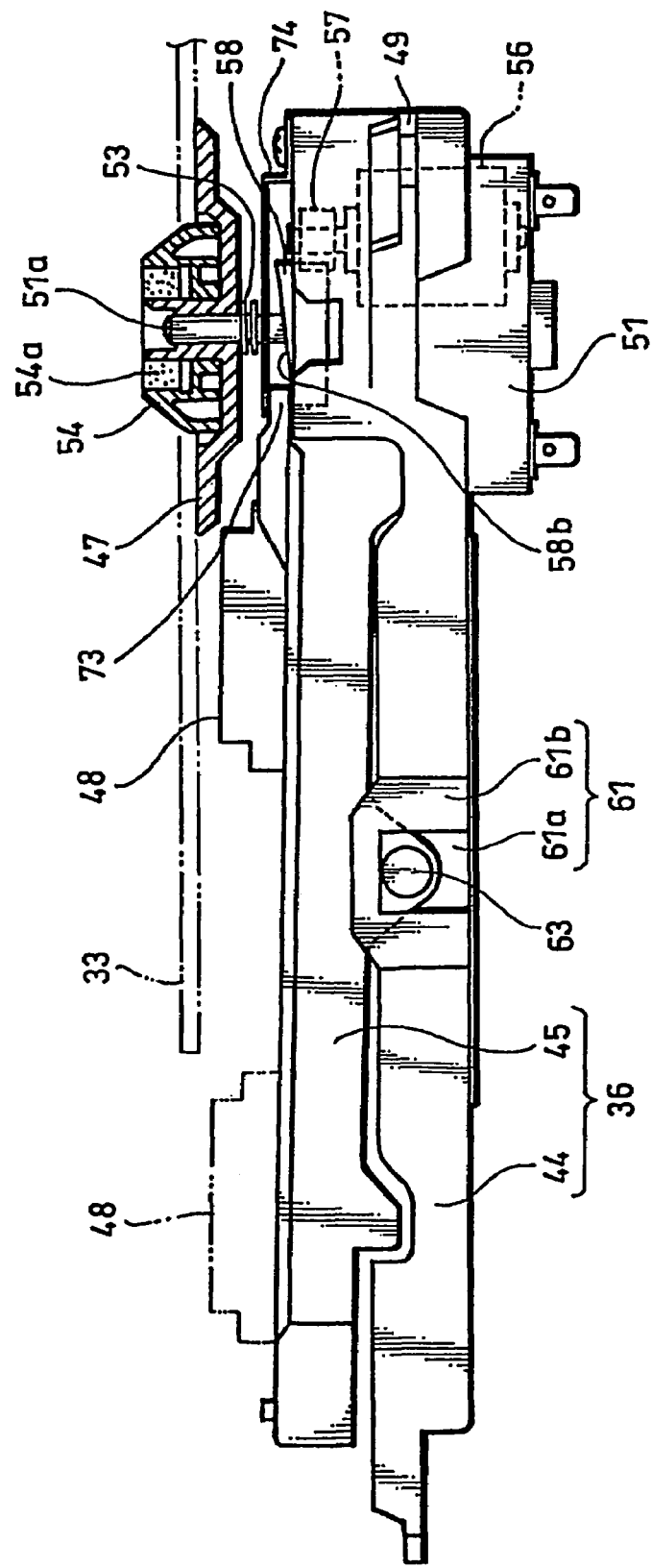
FIG. 12 is a side view of the base chassis of the disk driving apparatus according to the invention, showing a state where a pickup chassis is tilted forward.
Figure 13:
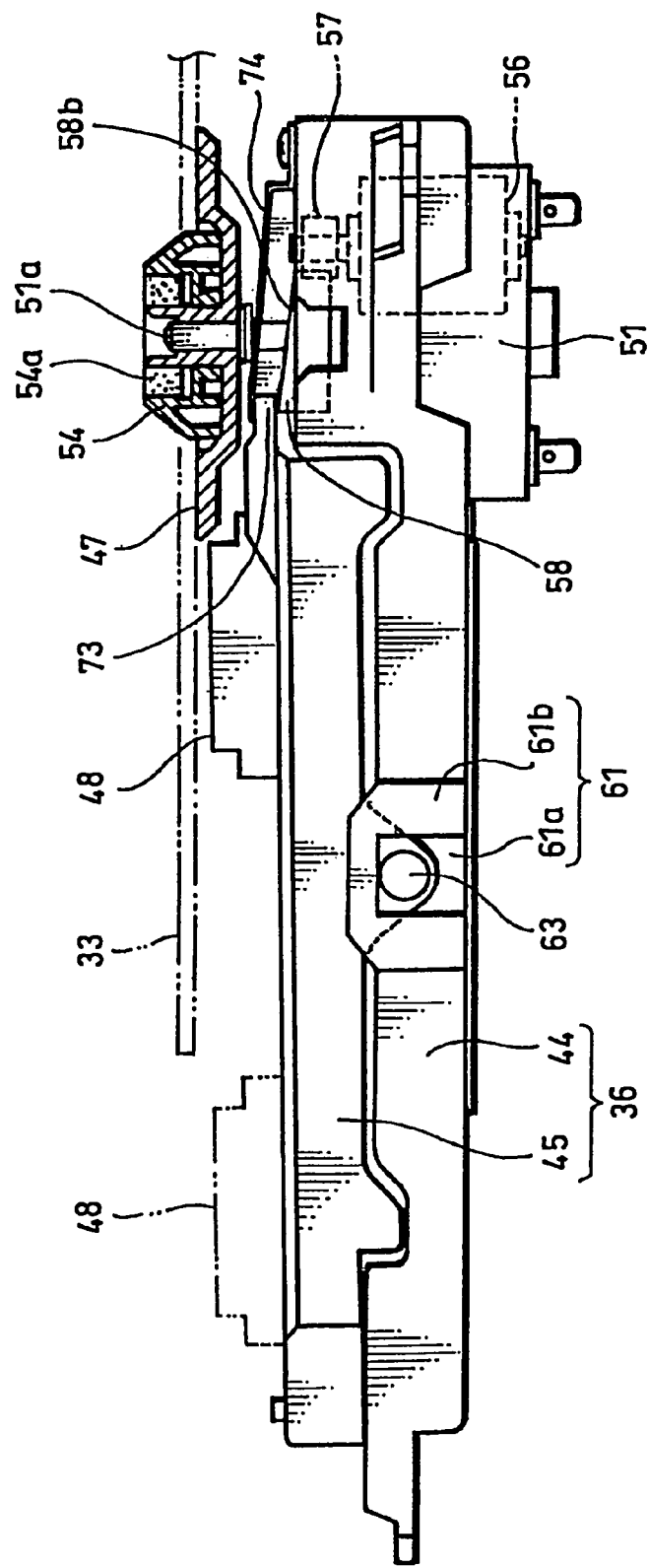
FIG. 13 is a side view of the base chassis of the disk driving apparatus according to the invention, showing a state where the pickup chassis is tilted rearward.

The system controller 92 is connected to a servo controller 93 so as to transmit/receive a signal to/from the servo controller 93. On the basis of the signal supplied from the system controller 92, the servo controller 93 outputs a signal to a motor driving circuit 94. The motor driving circuit 94 is used to drive the tilt motor 56. As necessary, the motor driving circuit 94 outputs a control signal to rotate the tilt motor 56 forward or reverse. By the rotating operation of the tilt motor 56, the pickup chassis 45 is changed into a state where it is tilted forward (tilt down stopper position), as shown in FIG. 12, or a state where it is tilted rearward (tilt up stopper position), as shown in FIG. 13, as a maximum tilt amount. The tilt control by the tilt operation mechanism is executed in the rotational range of the pickup chassis 45.

Figure 16:
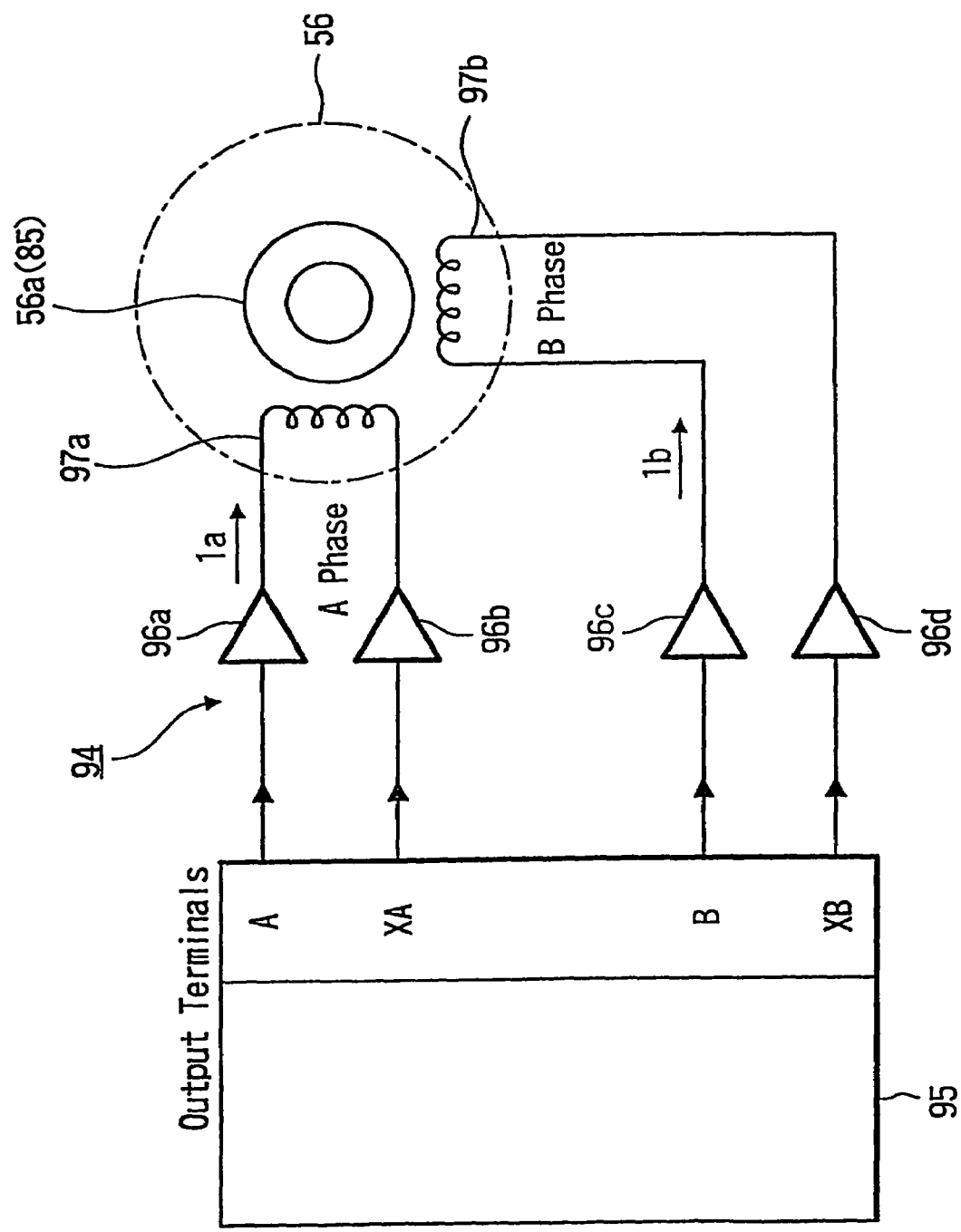
FIG. 16 is an explanatory diagram showing a schematic construction of a tilt driving circuit of the disk driving apparatus of the invention

The motor driving circuit 94 has a construction as shown in FIG. 16. The motor driving circuit 94 comprises, for example, a microcomputer (CPU) 95 having 8-bit parallel processing, four voltage/current amplifiers 96a to 96d, and two coils 97a and 97b. The microcomputer 95 has four output terminals A, XA, B, and XB and voltage/current amplifiers 96a to 96d are connected to the output terminals A, XA, B, and XB, respectively. One pair of voltage/current amplifiers 96a and 96b are connected to each other via the A-phase coil 97a and the other pair of voltage/current amplifiers 96c and 96d are connected to each other via the B-phase coil 97b. The A-phase coil 97a and the B-phase coil 97b are arranged so as to have a phase displaced by almost 90° from that of the tilt motor rotor 85. A current Ia is passed to the A-phase coil 97a and a current Ib is passed to the B-phase coil 97b.

Figure 17:
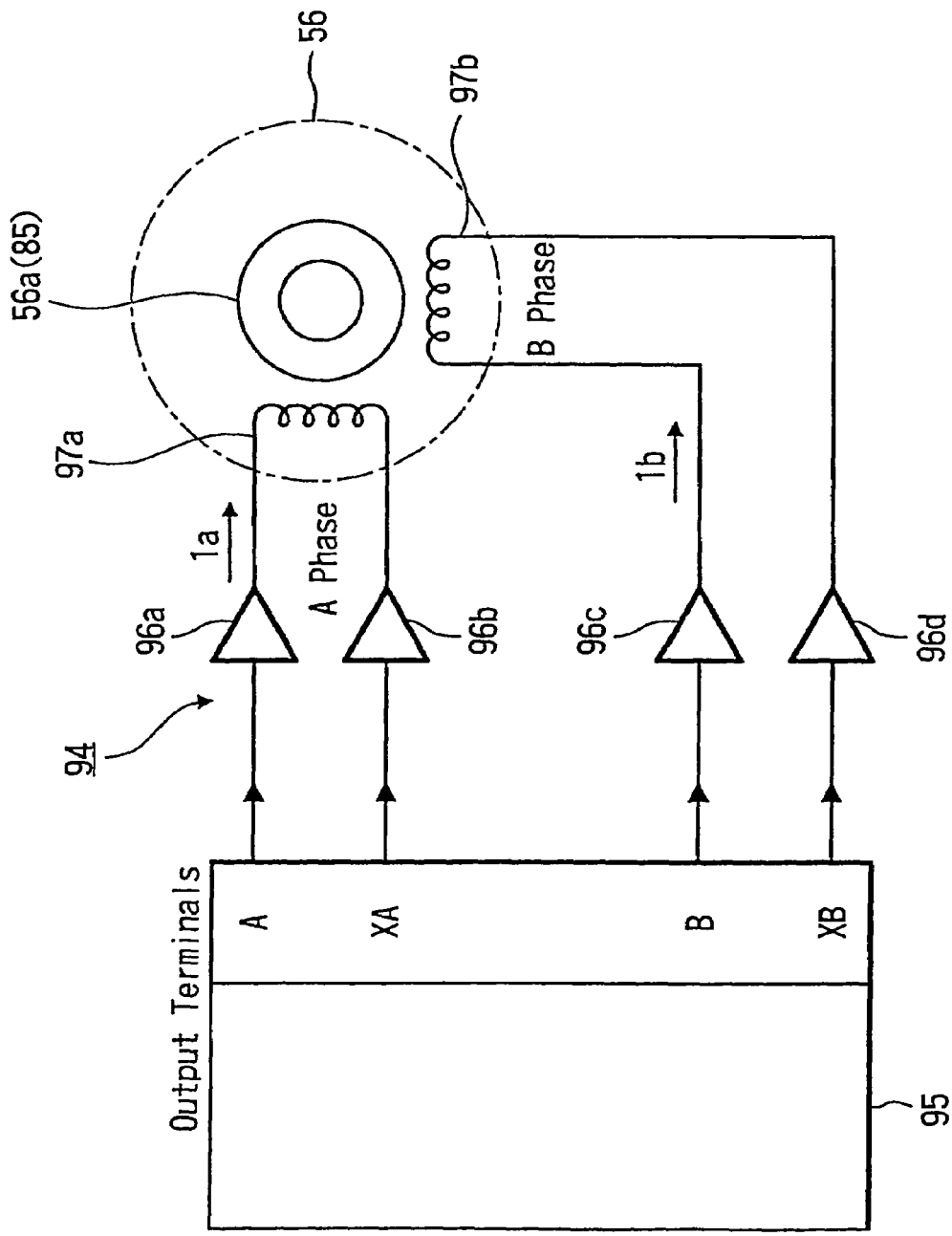
FIG. 17 is an explanatory diagram showing rotor stop positions in a two-phase exciting state of the tilt motor by a tilt driving circuit in the disk driving apparatus according to the invention.

The tilt motor 56 is driven by the motor driving circuit 94 having such a construction, for example, as shown in FIGS. 17 to 22. FIG. 17 is a diagram for explaining a basic operation of the two-pole, two-phase structure of the tilt motor 56 using a stepping motor. The tilt motor 56 is constructed so as to rotate once in 20 steps by two-phase excitation (one rotation in 40 steps by one-two phase excitation) and it is set so that the tilt cam 58 rotates once when the tilt motor 56 rotates twice. When the tilt motor 56 rotates twice, therefore, the tilt cam 58 rotates once, and the cam piece 73 which comes into contact with the cam face 58b is moved from the tilt down position to the tilt up position.

The basic operation of the two-pole, two-phase structure of the tilt motor 56 will now be described. Two-phase coil parts 86a, 86b and 87a, 87b are disposed at equal angle intervals on the outside of the rotor 85 where two poles, that is, the N-pole and the S-pole, are located in diametrical positions. The two-phase coil parts 86a and 86b are disposed so as to face each other over the rotor 85, and the two-phase coil parts 87a and 87b are disposed so as to face each other over the rotor 85. The line connecting the two-phase coil parts 86a and 86b perpendicularly crosses the line connecting the two-phase coil parts 87a and 87b. A current can be passed in the forward direction (the direction from the A– phase to the A+ phase and the direction from the B– phase to the B+ phase) and the reverse direction (the direction from the A+ phase to the A– phase and the direction from the B+ phase to the B– phase) in each phase.

Figure 18:
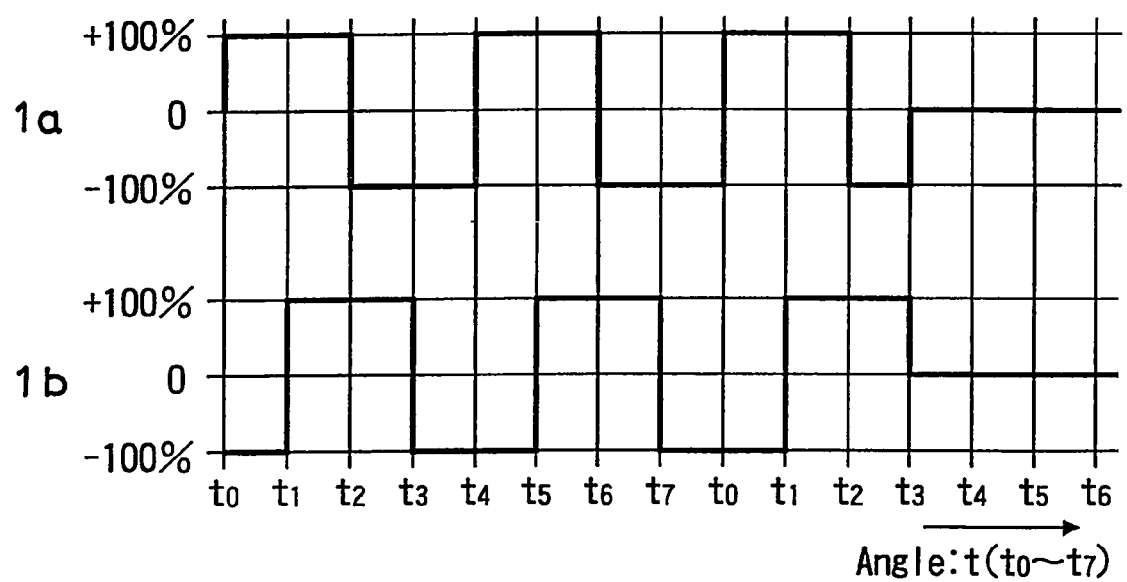
FIG. 18 is a timing chart showing an excitation pattern in the two-phase exciting state of the tilt motor by the tilt driving circuit in the disk driving apparatus according to the invention.
Figure 19:
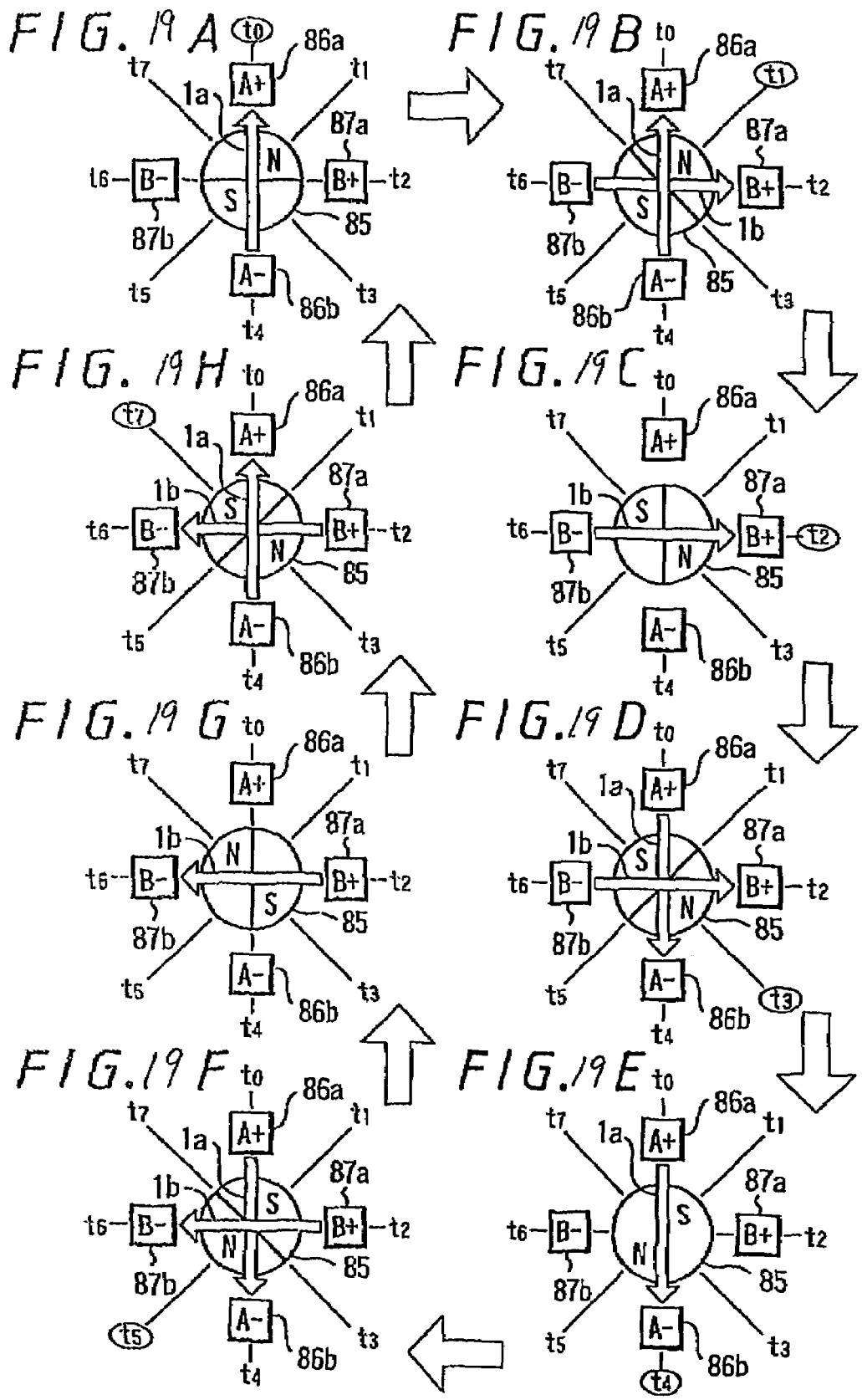
FIG. 19A-19H is an explanatory diagram showing rotor stop positions in the one-two phase exciting state of the tilt motor by the tilt driving circuit in the disk driving apparatus according to the invention.
Figure 20:
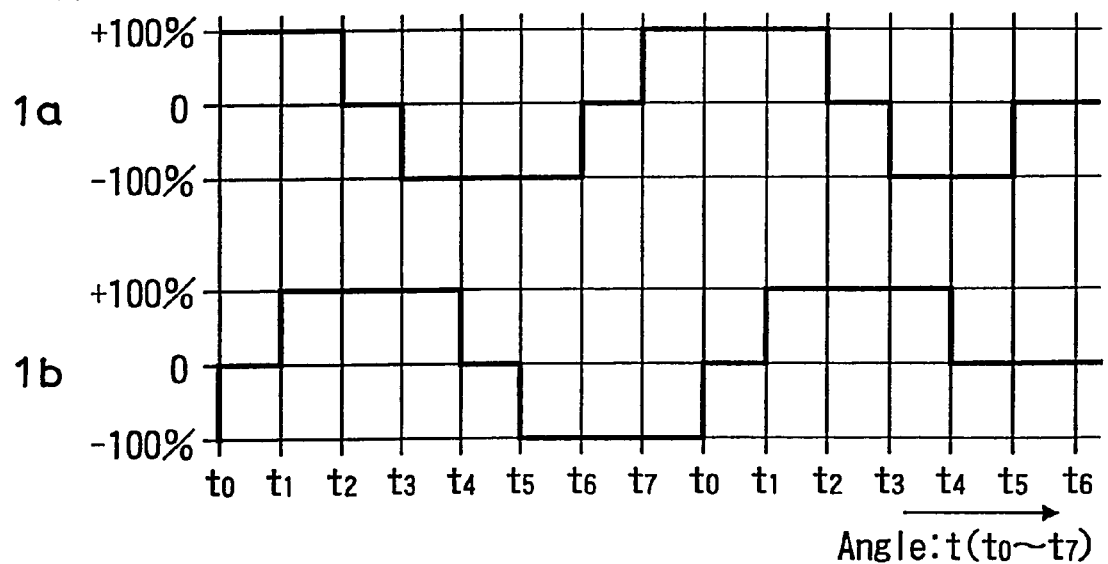
FIG. 20 is a timing chart showing an excitation pattern in the one-two phase exciting state of the tilt motor by the tilt driving circuit in the disk driving apparatus according to the invention.

The excitation patterns of the two-phase excitation when such a tilt motor 56 is used are shown in FIGS. 17 and 18 and the excitation patterns of the one-two phase excitation are shown in FIGS. 19 and 20. At a timing to, the current Ia in the positive direction is passed to the first phase (hereinafter "A phase") and the current Ib in the negative direction is passed to the second phase (hereinafter "B phase"). Then, the rotor 85 enters the state as shown in FIG. 18A and the N-pole stops so as to face the A+ phase at the 0th position t0. From such a state, at a timing t1, when the current Ib passed to the B phase is changed to the positive direction while passing the positive current Ia to the A phase, the rotor 85 enters the state as shown in FIG. 18B and the N-pole stops at the first position t1, which is between the A+ phase and the B+ phase.

At a timing t2, when the current Ia passed to the A phase is changed to the negative direction while passing the positive current Ib to the B phase, the rotor 85 enters the state as illustrated in FIG. 17C, and the N-pole stops, so as to face the B+ phase at the second position t2. Further, at a timing t3, when the current Ib to the B phase is changed to the negative direction while passing the negative current Ia to the A phase, the rotor 85 enters a state as shown in FIG. 17D and the N-pole stops at the third position t3 between the B+ phase and the A– phase.

In the following fifth to eighth steps, the currents Ia and Ib are passed in a manner similar to the above-mentioned four steps in a state where the N-pole and the S-pole are reversed in FIGS. 17A to 17D, and the rotation position of the rotor 85 changes according to the current direction. That is, at a timing t4, the N-pole of the rotor 85 stops so as to face the A– phase at the fourth position t4. At a timing t5, the N-pole of the rotor 85 stops between the A– phase and the B– phase at the fifth position t5. At a timing t6, the N-pole of the rotor 85 stops so as to face the B– phase at the sixth position t6. At a timing t7, the N-pole of the rotor 85 stops between the B– phase and the A+ phase at the seventh position t7.

The rotary shaft 56a rotates once in the 8 steps from the timing t0 to the timing t7. In FIG. 18, the timing t3 in the second rotation shows a state where the current to both of the A and B phases is stopped.

Referring to FIGS. 19 and 20, the excitation pattern by the one-two phase excitation will be described. First, at a timing t0, when the current Ia in the positive direction is passed to the A phase and the current Ib to the B phase is stopped, the rotor 85 enters the state as shown in FIG. 19A and the N-pole stops so as to face the A+ phase at the 0th position t0. From such a state, at a timing t1, when the positive current Ib is passed also to the B phase while passing the positive current Ia to the A phase, the rotor 85 enters the state as shown in FIG. 19B and the N-pole stops between the A+ phase and the B+ phase at the first position t1. At a timing t2, when the current Ia to the A phase is stopped while passing the positive current Ib to the B phase, the rotor 85 enters the state as illustrated in FIG. 19C and the N-pole stops so as to face the B+ phase at the second position t2.

Further, at a timing t3, when the negative current Ia is passed to the A phase while passing the positive current Ib to the B phase, the rotor 85 enters a state as shown in FIG. 19D and the N-pole stops at the third position t3 between the B+ phase and the A– phase. At a next timing t4, when the current Ib to the B phase is stopped while passing the negative current Ia to the A phase, the rotor 85 enters a state as illustrated in FIG. 19E and the N-pole stops so as to face the A– phase at the fourth position t4. At a timing t5, when the negative current Ib is also passed to the B phase while passing the negative current Ia to the A phase, the rotor 85 enters a state as shown in FIG. 19F and the N-pole stops at the fifth position t5 between the A– phase and the B– phase.

At a next timing t6, when the current Ia to the A phase is stopped while passing the negative current Ib to the B phase, the rotor 85 enters a state as shown in FIG. 19G and the N-pole stops so as to face the B– phase at the sixth position t6. Further, at a next timing t7, when the positive current Ia is passed to the A phase while passing the negative current Ib to the B phase, the rotor 85 enters a state as shown in FIG. 19H and the N-pole stops at the seventh position t7 between the B− phase and the A+ phase. After that, the operation shifts to the timing t0 as a timing t8 and the above-mentioned 8 steps are repeated. When the rotary shaft 56a rotates twice, the tilt cam 58 rotates once.

The relation between the stopper position and the rotor stop position in one rotation of the electrical angle of the tilt motor 56 will now be described with reference to FIG. 21. The left vertical column in FIG. 21 shows the phase of the electrical angle and the right vertical column in FIG. 21 shows the phase of the rotor 85. In FIG. 21, reference character L denotes a coil magnetic field vector and M indicates a rotary shaft 56a magnetic field vector. Reference numeral 88 denotes a stopper created when the rib part 58c, provided on the under surface of the tilt cam 58, comes into contact with the stopper boss 59a provided on the spindle chassis 44.

As shown in FIG. 21, the rotary shaft magnetic field vector M, mechanically determined by the stopper 88, is place in contact with the stopper 88 in the clockwise direction in any of the following cases: when the coil magnetic field vector L, at the timing t1, is directed to the first position t1 and the rotor 85 is stopped between the A+ phase and the B+ phase; when the coil magnetic field vector L is directed to the second position t2, at the next timing t2, and the rotor 85 is stopped so as to face the B+ phase; when the coil magnetic field vector L is directed to the third position t3, at the timing t3, and the rotor 85 is stopped between the B+ phase and the A− phase; and when the coil magnetic field vector L is directed to the fourth position t4, at the timing t4, and the rotor 85 is stopped so as to face the A− phase. In any of these times, since the angle between the magnetic field vector M and the coil magnetic field vector L is 180° or larger in the counterclockwise direction, force in the counterclockwise direction is not generated in the rotor 85. Since the state where the mechanical magnetic field vector M is directed to the stopper 88 is maintained, the rotor 85 cannot be rotated until coil magnetic field vector L coincides with magnetic field vector M and the coil magnetic field vector L is reversely rotated in the counter clockwise direction.

Contrarily, the magnetic field vector M of the rotary shaft 56a, mechanically determined by the stopper 88, is positioned away from the stopper 88 in any of the following cases: when the coil magnetic field vector L is directed to the fifth position t5, at the timing t5, and the rotor 85 is stopped between the A− phase and the B− phase; when the coil magnetic field vector L is directed to the sixth position t6, at timing t6, and the rotor 85 is stopped so as to face the B− phase; when the coil magnetic field vector L is directed to the seventh position t7, at timing t7, and the rotor 85 is stopped between the B− phase and the A+ phase; and when the coil magnetic field vector L is directed to the 0th position t0 (=eighth position t8), at timing t0, and the rotor 85 is stopped so as to face the A+ phase. That is, in the above cases, since the angle between the magnetic field vector M and the magnetic field vector L is 180° or smaller in the counterclockwise direction, a force in the direction of the angle smaller than 180°, that is, in the counterclockwise direction, is generated in the rotor 85. Therefore, by the force in the counterclockwise direction, the rotor 85 is rotated.

When a phase deviation occurs between the magnetic field vector M and the coil magnetic field vector L, as described above, the electrical phase and the mechanical phase of the tilt motor 56 do not coincide with each other. At the time of mounting the tilt cam 58, therefore, the electrical and mechanical phases of the tilt motor 56 are adjusted so as to coincide with each other. The method of making the phases coincident can be carried out, for example, as follows. At the time of assembling the tilt motor 56, a positive voltage is applied to only the A phase of the tilt motor 56 and the base unit 15 is assembled so that the tilt up stopper position is obtained in such a state. In such a manner, at the tilt up stopper position of the base unit 15, the electrical and mechanical phases of the tilt motor 56 can be made coincident with each other. As a result, even if a loss of synchronism occurs, the electrical phase can be made coincident with the mechanical phase. In other words, since the electrical phase corresponding to the tilt up stopper position, at which rib part 58c of the tilt cam 58 comes into contact with stopper boss 59 of spindle chassis 44, is known in advance by the above-mentioned assembling work, the electrical and mechanical phases can be made coincident with each other even if loss of synchronization occurs. Therefore, the accuracy of the tilt reference position can be improved.

The loss of synchronism in the tilt motor 56 will now be described. By "loss of synchronization" what is meant is that the coil magnetic field rotates while the rotating shaft 56a remains stationary. Therefore, a phase deviation occurs between electrical and mechanical phases. That is, when the rib part 58c of the tilt cam 58 comes into contact with the stopper boss 59a of the spindle chassis 44 by the rotation of the rotary shaft 56a of the tilt motor 56, the rotation of the rotary shaft 56a is stopped. When a current is further supplied in such a state, the rotor 85 tries to rotate further. This rotation is, however, mechanically regulated by the stopper 88 (the contact between the rib part 58c and the stopper boss 59a) so that the rotor 85 does not rotate. Consequently, the "loss of synchronism" occurs when only the coil magnetic field rotates while the rotor of the motor does not rotate.

By using the loss of synchronism of the tilt motor 56, the tilt neutral position can be obtained. A procedure for obtaining the tilt neutral position will now be described. According to a first method thereof, loss of synchronism is intentionally caused in the motor at the mechanical stopper position (tilt down stopper position or tilt up stopper position), thereby obtaining a reference position. The motor is driven only by a predetermined pulse amount from the reference position and the tilt neutral position is determined. In the embodiment, the tilt motor 56 rotates twice in 40 steps in the two-phase excitation. Moreover, pickup chassis 45 is set so as to be rotatable in the vertical direction from the tilt down stopper position to the tilt up stopper position in the two rotations of the motor.

Since an initial position of the tilt operation is unknown, the tilt motor 56 is rotated a predetermined number of steps (for example, 40 steps) in the tilt up direction (or the tilt down direction). At this time, as shown by parentheses in FIG. 22, in the case of an ordinary operation where the initial position is the tilt minimum position, the tilt cam comes into contact with the stopper and reaches the minimum position after 40 pulses. In this case, therefore, no loss of synchronism occurs. The tilt maximum position (or tilt minimum position) is set as a reference position and the rotary shaft 56a is rotated from the reference position in the reverse direction (tilt down direction) only by predetermined 20 steps (½ of 40 pulses). The tilt neutral point can be consequently obtained and the pickup chassis 45 can be set at the tilt neutral position. Therefore, by setting the tilt minimum position as an initial position, an offensive noise, due to the loss of synchronization, can be prevented.

On the other hand, when the initial position is deviated from the tilt minimum position, the tilt cam comes into contact with the stopper before the application of 40 pulses. Consequently, a loss of synchronism occurs in the motor 56 before application of 40 pulses. Since the tilt maximum position is obtained when the rotary shaft 56a rotates a total of 40 steps, including the rotation of the internal magnetic field due to the loss of synchronism, the tilt maximum position is set as a reference position. In a manner similar to an ordinary operation, by rotating the rotary shaft 56a from the reference position only by 20 steps in the reverse direction (tilt down direction), the tilt neutral position can be obtained.

According to a second method, after the tilt reference position is obtained, the pickup chassis 45 is not operated to a mechanically determined tilt neutral. Rather, the pickup chassis 45 is rotated to a tilt neutral point obtained by measuring a reference position where no warp occurs, thereby obtaining the tilt neutral position. With this method, the tilt motor 56 rotates twice in 80 steps in the one-two phase excitation and the pickup chassis 45 is set so as to be rotatable in the vertical direction from the tilt down stopper position to the tilt up stopper position.

Figure 22:
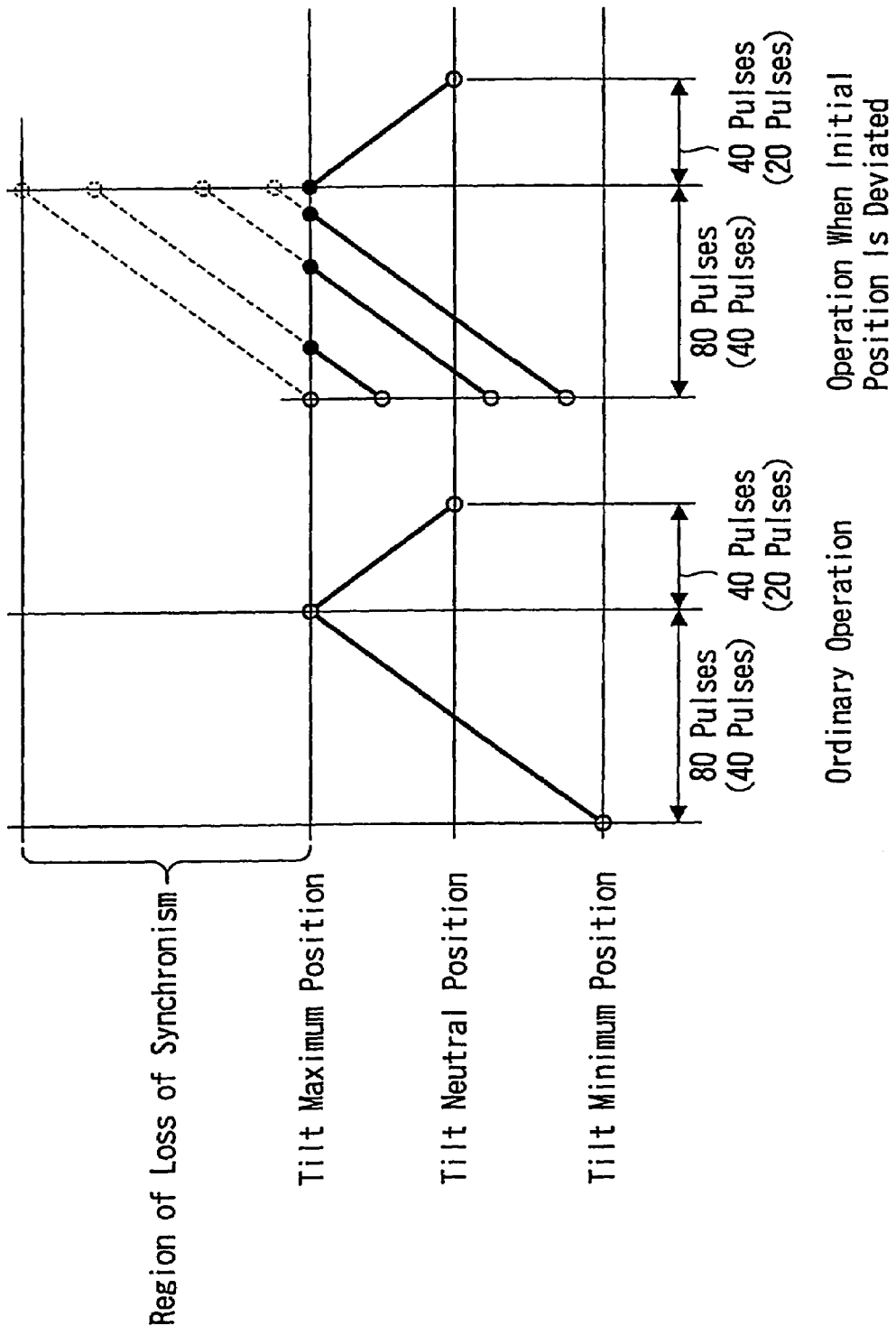
FIG. 22 is an explanatory diagram showing the idea of an initializing operation of the tilt motor by the tilt driving circuit in the disk driving apparatus of the invention.
Figure 23:
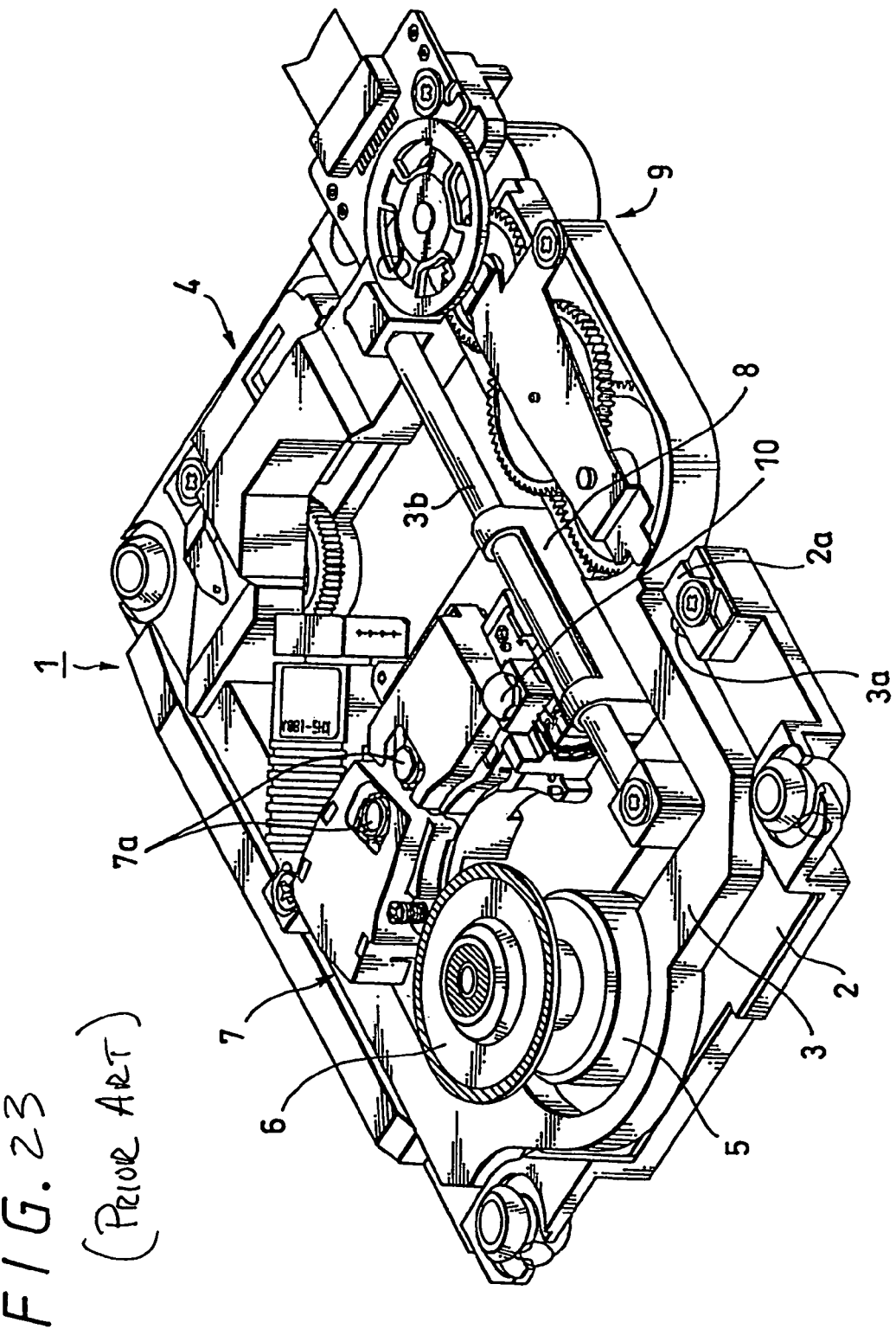
FIG. 23 is a perspective view of a conventional disk driving apparatus.

Since the initial position of the tilt operation is unknown, the tilt motor 56 is allowed to rotate a predetermined number of steps (for example, 80 steps) in the tilt up direction (or the tilt down direction). At this time, as shown in FIG. 22, in the case of an ordinary operation in which the initial position is the tilt minimum position, the tilt cam comes into contact with the stopper after rotation of 80 pulses and reaches the tilt maximum position. In this case, therefore, no loss of synchronism occurs in the tilt motor 56. The tilt maximum position is therefore set as a reference position and the rotary shaft 56a is rotated from the reference position in the reverse direction (tilt down direction) to a predetermined neutral point, thereby enabling the pickup chassis 45 to be set at the tilt neutral position.

The predetermined neutral point can be set, for example, as follows. A reference optical disk having no warp is reproduced, and the tilt position at which a read signal from the optical disk is the most preferable is set as the tilt neutral point. A step amount from this tilt neutral point to the tilt maximum position (or tilt minimum position) as a reference position, is written into a non-volatile memory or the like and the pickup chassis 45 is moved to the tilt neutral point on the basis of the step amount. Even if the position of the mechanically determined neutral point varies, the variation is ignored and the neutral point recorded in the memory is used, thereby enabling the pickup chassis 45 to be set at the tilt neutral position.

According to the disk driving apparatus 11, for example, an operation of reproducing the optical disk 33 can be executed as follows. First, after turning on the power source of the disk driving apparatus 11, for example, an ejection button is pressed to eject the disk tray 13. In such an ejected state, the disk housing part 34 is exposed so that the optical disk 33 can be placed into either the large diameter part 34a or the small diameter part 34b.

After placing a desired optical disk 33 onto the disk housing part 34, a reproduction button (for example) is pressed and the loading mechanism is operated, thereby conveying the disk tray 13 to the disk placing part. Such a state is shown in FIG. 10. The chuck holder 80, illustrated in FIG. 9, and can entirely cover both the disk housing part 34 and the opening 35.

When the loading motor 20 is driven by the operation of the reproduction button, the torque thereof is transmitted from the driving pulley 21 to the driven pulley 23 via the rubber belt 22. The rotary force of the driven pulley 23 is transmitted to the driving gear 26 via the middle part gear 25b and the upper gear 25a in the intermediate gear 25. The rotary force of the driving gear 26 is transmitted to the rack of the disk tray 13 and the disk tray 13 is guided by the tray guide 31 and the guide pins 32a and 32b toward the rear part of the main chassis 12. During the movement of the disk tray 13 to the rear part, the lower gear 25c in the intermediate gear 25 is disengaged from the rack 27a of the chuck cam 27, so that the chuck cam 27 does not move.

After the disk tray 13 has been moved to the rear part, the upper operation pin 27c enters the cam groove formed on the under surface of the disk tray 13, and the chuck cam 27 is moved slightly, being guided by the cam groove. As a result, the rack 27a of the chuck cam 27 comes into engagement with the lower gear 25c, thereby enabling the torque of the loading motor 20 to be transmitted. On the other hand, when the disk tray 13 reaches the rear part, the rack of the disk tray 13 and the driving gear 26 are disengaged from each other so that the torque of the loading motor 20 cannot be transmitted.

When the torque of the loading motor 20 is transmitted from the lower gear 25c to the rack 27a, the chuck cam 27 is moved in the direction away from the loading motor 20, against the spring force of the helical tension spring 29. By the movement of the chuck cam 27, the cam pin 28 of the base holder 14, engaged with the cam groove 27b, is moved from the lower horizontal part of the cam groove 27b to the upper horizontal part via the inclined part. As a result, the base holder 14 is lifted upward via the shaft part 14a at the rear part and becomes almost horizontal. FIG. 11 shows this state.

When the front part of the base holder 14 is lifted, the turntable 47 enters the opening 35 of the disk tray 13. Accordingly, the chucking ring 54 attached to the turntable 47 enters the central hole 33a of the optical disk 33 and the optical disk 33 is placed on the turntable 47. At this time, when the optical disk 33 is slightly lifted up by the turntable 47, the chuck plate 81, held by the chuck holder 80, is attracted by the chucking ring magnet 54a.

As a result, the optical disk 33 is sandwiched by the turntable 47 and the chuck plate 81. Thus, the optical disk 33 is rotated together with the turntable 47 at a predetermined rotational speed by the torque of the spindle motor 51.

Simultaneously, or before or after that, the feed motor 70 is driven. By the rotation of the feed shaft 69, consequently, the sliding member 75 of the optical pickup device 48 is moved toward the turntable 47, in accordance with the direction of the rotation. By the movement of the optical pickup device 48 toward the turntable 47, the inclination of the optical disk 33 can be detected. The inclination amount of the optical disk 33 can be detected, for example, as follows.

When the optical pickup device 48 moves from the outside of the optical disk 33 toward the inside in the radial direction, a laser beam is emitted from the objective lens 68a of the optical head 68 toward the information recording surface of the optical disk 33. The time until the emitted laser beam returns is continuously detected. By comparing the detected times, the inclination amount of the optical disk 33 can be detected.

The operation of correcting the inclination amount of the optical disk 33, detected as mentioned above, will now be described. It is now assumed that the pickup chassis 45 is inclined toward the turntable 47 side, as shown in FIG. 12, with respect to the spindle chassis 44 of the base chassis 36. When the inclination of the optical disk 33 is detected in such a state, the tilt motor 56 is driven and its torque is transmitted from the rotary shaft 56a to the tilt gear 57. By the rotation of the tilt gear 57, the rotary force is transmitted from the gear part 58a, engaged with the tilt gear 57, to the tilt cam 58. The tilt cam 58 is thus rotated in accordance with the rotation amount of the tilt motor 56.

The cam piece 73 of the pickup chassis 45 is urged against the cam face 58b by the spring force of the plate spring 74. As a result, since the cam piece 73 moves along the cam face 58b, the pickup chassis 45 is rotated around the pair of right and left rotary shafts 63 and its posture is changed in the counterclockwise direction, as shown in FIG. 12. When the highest position of the cam face 58b comes into contact with the cam piece 73, the pickup chassis 45 is inclined rearward, as shown in FIG. 13.

After the inclination amount of the optical disk 33 is adjusted by the adjustment of the tilt mechanism, the information signal recorded on the information recording surface of the optical disk 33 is reproduced by the optical pickup device 48. The reproduction of the information signal by the optical pickup device 48 is performed, for example, as follows. A laser beam is irradiated from the objective lens 68a of the optical head 68 on the information recording surface and the reflection light of the laser beam is received via the objective lens 68a, thereby reproducing the information signal recorded on the information recording surface.

Upon ejecting the disk tray 13, an operation opposite to that of loading is performed. For example, when the ejection operation is selected by pressing the ejection button, the loading motor 20 is rotated in the reverse direction. The motor torque is transmitted to the rack 27a via the driving pulley 21, the rubber belt 22, the driven pulley 23, and the lower gear 25c of the intermediate gear 25. By this operation, the chuck cam 27 is moved toward the loading motor 20 and the cam pin 28 is pressed down. As a result, the base holder 14 is changed from the horizontal state shown in FIG. 11 to the forward tilt state shown in FIG. 10.

Accordingly, the base unit 15, supported by the base holder 14, is moved downward and the turntable 47, on which the optical disk 33 is placed, is moved downward. The lowering operation of the turntable 47 causes the chuck plate 81 to come off. Subsequently, the chucking ring 54 comes out from the central hole 33a of the optical disk 33 and the optical disk 33 is placed in the disk housing part 34 of the disk tray 13. When such a state is obtained, the disk tray 13 can slide out.

It is understood that the invention is not limited to the foregoing embodiment. Although the case where the read only optical disk such as a CD, a CD-ROM or the like, is used as an information recording medium has been described in the embodiment, a recordable optical disk or magneto-optic disk to which information can be written can be used as the information recording medium. Further, although the case where the optical disk such as CD is used in a bare state, an information recording medium housed in a disk cartridge may be also used.

Although the disk tray type disk driving apparatus for reproducing (reading) the information recorded on an optical disk and its head feeding mechanism have been described in the embodiment, obviously, the invention can be applied to a recording only disk driving apparatus only for recording information and can be also applied to a disk driving apparatus capable of recording and reproducing information and its head feeding mechanism. The invention is not limited to the foregoing embodiment but can be variously changed without departing from the spirit and scope thereof.

We claim:

1. A disk recording and/or reproducing apparatus comprising:
   a spindle chassis for rotationally supporting a turntable on which an optical disk, to/from which information is recorded and/or reproduced, is placed;
   a pickup chassis, rotationally supported on said spindle chassis, for movably supporting an optical pickup device for writing and/or reading said information to/from said optical disk and being movable toward and away from the turntable; and
   a tilt mechanism for adjusting a tilt angle of said optical pickup device with respect to said optical disk by rotating said pickup chassis with respect to the spindle chassis, said tilt mechanism comprising:
      a stepping motor for rotating said pickup chassis with respect to said spindle chassis; and
      a control circuit for driving said stepping motor to set the tilt angle at a predetermined neutral position without a tilt sensor input;
      wherein said control circuit drives said stepping motor to obtain a reference position by causing a loss of synchronism of said stepping motor.

2. A disk recording and/or reproducing apparatus according to claim 1, wherein said control circuit drives said stepping motor by outputting a signal representing a number of steps corresponding to a tilt angle between the predetermined neutral position and the reference position.

3. A disk recording and/or reproducing apparatus according to claim 2, wherein said control circuit includes a memory for storing the predetermined neutral position.

4. A disk recording and/or reproducing apparatus according to claim 1, wherein the predetermined neutral position is indicative of a middle position between a tilt minimum position and a tilt maximum position.

5. A disk recording and/or reproducing apparatus according to claim 1, wherein the predetermined neutral position is indicative of a position at which an optical disk having no warp is reproduced most preferably.

6. A disk recording and/or reproducing apparatus according to claim 1, wherein said stepping motor is assembled on said tilt mechanism in such a manner that an electrical phase of said stepping motor is coincident with a mechanical phase of said tilt mechanism.

7. An apparatus for adjusting the tilt angle of an optical pickup device, comprising:
   a first chassis assembly for rotationally supporting a recording medium driving means;
   a second chassis assembly rotationally supported on said first chassis assembly, for supporting a head device for writing and/or reading information to/from said recording medium;
   a tilt drive mechanism mechanically engaged with said second chassis assembly; and
   control circuitry, having no tilt sensor input, electrically connected to said tilt drive mechanism, said control circuitry outputting a control signal to said tilt drive mechanism;
   wherein said tilt drive mechanism comprises:
      a stepper motor connected to receive the control signal output from said control circuitry; and
      a cam having a portion mechanically engaged with said stepper motor, and a spiral surface mechanically engaged with said second chassis assembly.

8. An apparatus for adjusting the tilt angle of an optical pickup device according to claim 7, wherein said control circuit comprises a memory storage device.

9. An apparatus for adjusting the tilt angle of an optical pickup device according to claim 7, further comprising:
- a protrusion extending from an end of said second chassis assembly, and located proximate said spiral surface; and
- a biasing device having a fixed end and a free end, said fixed end being attached to said first chassis assembly, and said free end being in contact with said protrusion, thereby continuously biasing said second chassis assembly onto said spiral surface.

10. A method of adjusting the tilt angle of an optical device tilt mechanism to a predetermined neutral position, the method comprising the steps of:
- rotating a drive unit in a first direction until the tilt mechanism reaches a predetermined reference position; and
- rotating the drive unit in a second direction, opposite to the first direction, a predetermined number of rotations, thereby positioning the tilt mechanism to the predetermined neutral position;
- wherein the predetermined reference position coincides with a loss of synchronism between an electrically induced magnetic field in the drive unit and a mechanical magnetic field in the drive unit.

11. A method of adjusting the tilt angle of an optical device mechanism according to claim 10, wherein the predetermined neutral position coincides with a position halfway between a tilt mechanism minimum tilt position and a tilt mechanism maximum tilt position.

12. A method of adjusting the tilt angle of an optical device mechanism according to claim 10, further comprising the step of:
- synchronizing an electrically induced magnetic field phase of the drive unit and a mechanical magnetic field phase of the drive unit, prior to rotating the drive unit in the first direction.

13. A method of adjusting the tilt angle of an optical device tilt mechanism according to claim 12, wherein said synchronizing step comprises:
- electrically energizing a portion of the drive unit; and
- assembling the drive unit to the tilt mechanism with the tilt mechanism positioned to the predetermined reference position.

14. A method of adjusting the tilt angle of an optical device tilt mechanism according to claim 10, further comprising the steps of:
- retrieving the predetermined neutral position from a memory device, prior to rotating the drive unit in the second direction.

15. A method of adjusting the tilt angle of an optical device tilt mechanism according to claim 14, further comprising the step of:
- setting the predetermined neutral position, prior to rotating the drive unit in the first direction.

16. A method of adjusting the tilt angle of an optical device tilt mechanism according to claim 15, wherein said setting step comprises the steps of:
- positioning a reference optical disk proximate the optical device, said reference optical disk having no warp;
- generating a read signal by reading information recorded on the reference optical disk;
- setting the predetermined neutral position to coincide with a predetermined level of the read signal; and
- storing the predetermined neutral position in the memory device.

* * * * *